(12) United States Patent
Atalla

(10) Patent No.: US 10,036,336 B2
(45) Date of Patent: Jul. 31, 2018

(54) APPARATUS TO IMPROVE THE EFFICIENCY OF INTERNAL COMBUSTION ENGINES, AND METHOD THEREFOR

(75) Inventor: Naji Amin Atalla, Londonderry (GB)

(73) Assignee: Hawar Technologies Limited (QA)

( * ) Notice: Subject to any disclaimer, the term of this patent is extended or adjusted under 35 U.S.C. 154(b) by 354 days.

(21) Appl. No.: 12/310,809

(22) PCT Filed: Nov. 22, 2006

(86) PCT No.: PCT/GB2006/004373
§ 371 (c)(1),
(2), (4) Date: Oct. 5, 2009

(87) PCT Pub. No.: WO2007/045918
PCT Pub. Date: Apr. 26, 2007

(65) Prior Publication Data
US 2010/0024750 A1    Feb. 4, 2010

(30) Foreign Application Priority Data

Sep. 8, 2006 (GB) .................................. 0617726.5

(51) Int. Cl.
*F02F 3/00* (2006.01)
*F02D 41/00* (2006.01)
(Continued)

(52) U.S. Cl.
CPC .......... *F02D 41/0002* (2013.01); *F02B 21/00* (2013.01); *F02B 2275/32* (2013.01); *F02D 13/0269* (2013.01); *Y02T 10/42* (2013.01)

(58) Field of Classification Search
CPC .................................................. F02D 13/0269
(Continued)

(56) References Cited

U.S. PATENT DOCUMENTS

| 336,505 A | 2/1886 | Atkinson |
| 4,128,092 A * | 12/1978 | Yokota ................... F02B 19/12 |
| | | 123/193.4 |

(Continued)

FOREIGN PATENT DOCUMENTS

| DE | 102004005751 A1 | 8/2004 |
| EP | 0 945 606 A2 | 9/1999 |

(Continued)

OTHER PUBLICATIONS

Boggs et al.; "The Otto-Atkinson Cycle Engine-Fuel Economy and Emissions Results and Hardware Design;" SAE Technical Paper Series No. 950089; International Congress and Exposition, Feb. 27, 1995; 15 sheets.

(Continued)

*Primary Examiner* — Marguerite McMahon
*Assistant Examiner* — James Kim
(74) *Attorney, Agent, or Firm* — Lerner, David, Littenberg, Krumholz & Mentlik, LLP

(57) ABSTRACT

Method and apparatus for controlling the volume of air or air and non-combusted fuel mixture inside a combustion chamber and cylinder of an internal combustion engine. The apparatus includes an inlet-outlet portal having open and closed states and connected to air or air and non-combusted fuel source(s), and a combustion chamber with reduced volume. The inlet-outlet portal is controlled, when open, to permit air or air and non-combusted fuel mixture to enter or enter and exit the combustion chamber and cylinder and when closed to prevent air or air and non-combusted fuel mixture from entering or exiting the chamber and cylinder, in which the volume of air or air and non-combusted fuel mixture located inside the chamber and cylinder when the inlet-outlet portal closes, is less than the volume of the combustion chamber and cylinder defined when the piston is (Continued)

at the bottom dead center position inside the cylinder when the inlet-outlet portal is closed.

41 Claims, 11 Drawing Sheets

(51) Int. Cl.
F02D 13/02 (2006.01)
F02B 21/00 (2006.01)

(58) Field of Classification Search
USPC ........................................................ 123/193.6
See application file for complete search history.

(56) References Cited

U.S. PATENT DOCUMENTS

| | | | |
|---|---|---|---|
| 4,174,683 A | | 11/1979 | Vivian |
| 4,242,948 A | | 1/1981 | Stang et al. |
| 4,565,167 A | | 1/1986 | Bryant |
| 4,742,805 A | * | 5/1988 | Matsushita ............ F02B 23/04 123/256 |
| 5,005,539 A | * | 4/1991 | Kawamura .............. F01L 9/04 123/21 |
| 5,029,563 A | * | 7/1991 | Hu ......................... F02B 19/04 123/262 |
| 5,195,486 A | * | 3/1993 | Ishii ....................... F02B 19/04 123/257 |
| 5,233,948 A | * | 8/1993 | Boggs ................... F02B 41/04 123/432 |
| 5,269,144 A | | 12/1993 | Miller et al. |
| 5,322,042 A | * | 6/1994 | di Priolo ................ F02B 19/14 123/193.6 |
| 5,363,822 A | * | 11/1994 | Tuohy .................. F02F 3/0023 123/193.6 |
| 5,427,063 A | * | 6/1995 | Anderson ........... F02B 75/042 123/48 A |
| 5,617,823 A | * | 4/1997 | Gray, Jr. .............. F02B 23/101 123/254 |
| 5,682,854 A | * | 11/1997 | Ozawa ................... F01L 1/053 123/316 |
| 5,806,490 A | * | 9/1998 | Nogi et al. .................... 123/435 |
| 5,855,192 A | * | 1/1999 | McCowan .............. F02B 1/12 123/179.21 |
| 6,125,802 A | * | 10/2000 | Pen ............................ 123/48 B |
| 6,237,551 B1 | * | 5/2001 | Macor et al. ............. 123/90.15 |
| 6,474,278 B1 | * | 11/2002 | Davis ..................... F01L 1/34 123/90.15 |
| 6,584,943 B1 | * | 7/2003 | Klotz ...................... F01L 1/26 123/90.16 |
| 7,093,568 B2 | * | 8/2006 | Yang ...................... F02B 1/12 123/27 R |
| 7,131,408 B2 | * | 11/2006 | Baeuerle ................ F01L 1/34 123/90.11 |
| 7,380,493 B2 | | 6/2008 | Park et al. |
| 8,448,440 B2 | | 5/2013 | Peoples et al. |
| 2001/0018904 A1 | | 9/2001 | Suzuki et al. |
| 2001/0054398 A1 | | 12/2001 | Morikawa et al. |
| 2002/0026913 A1 | | 3/2002 | Ariga |
| 2003/0097998 A1 | | 5/2003 | Gray |
| 2003/0159675 A1 | | 8/2003 | Huebler et al. |
| 2003/0200953 A1 | | 10/2003 | Lippert et al. |
| 2004/0006986 A1 | | 1/2004 | Baeuerle |
| 2004/0123855 A1 | | 7/2004 | Yonekawa et al. |
| 2004/0134449 A1 | * | 7/2004 | Yang ...................... F02B 1/12 123/27 R |
| 2004/0194748 A1 | * | 10/2004 | Asai ........................ F01L 1/08 123/90.17 |
| 2005/0061270 A1 | * | 3/2005 | Yamada .................... 123/78 E |
| 2005/0241613 A1 | | 11/2005 | Weber et al. |
| 2006/0011154 A1 | * | 1/2006 | Scuderi et al. ............ 123/70 R |
| 2006/0027208 A1 | | 2/2006 | Pinkston |
| 2007/0089416 A1 | | 4/2007 | Weber et al. |
| 2007/0295290 A1 | | 12/2007 | Cao |

FOREIGN PATENT DOCUMENTS

| | | |
|---|---|---|
| EP | 1 353 057 A1 | 10/2003 |
| EP | 1 363 002 A1 | 11/2003 |
| EP | 1526265 A2 | 4/2005 |
| EP | 1 541 849 A1 | 6/2005 |
| EP | 1 630 392 A2 | 3/2006 |
| GB | 116012 | 5/1918 |
| GB | 739740 | 11/1955 |
| JP | 47-020567 | 1/1969 |
| JP | 54-097608 | 7/1979 |
| JP | 54-140018 | 10/1979 |
| JP | S57181923 A | 11/1982 |
| JP | 60 230549 A | 11/1985 |
| JP | 63-61556 | 4/1988 |
| JP | 02 040056 A | 8/1990 |
| JP | 03-001231 | 1/1991 |
| JP | 03-064649 | 3/1991 |
| JP | H0364649 A | 3/1991 |
| JP | 06-033805 | 2/1994 |
| JP | 06-066200 | 3/1994 |
| JP | 06-108860 | 4/1994 |
| JP | H06108860 A | 4/1994 |
| JP | 08-326548 | 12/1996 |
| JP | H08326548 A | 12/1996 |
| JP | 9 166030 A | 6/1997 |
| JP | H09166030 A | 6/1997 |
| JP | 11-159311 | 6/1999 |
| JP | H11159311 A | 6/1999 |
| JP | 2000-73768 A | 3/2000 |
| JP | 2001227368 A | 8/2001 |
| JP | 2002070598 A | 3/2002 |
| JP | 2002371912 A | 12/2002 |
| JP | 2003-083099 | 3/2003 |
| JP | 2004183513 A | 7/2004 |
| JP | 2004218522 A | 8/2004 |
| JP | 2006-161666 | 6/2006 |
| JP | 2006161666 A | 6/2006 |
| JP | 2007227368 A | 9/2007 |
| KR | 19960041660 | 12/1996 |
| KR | 19980021346 U | 6/1998 |
| WO | WO 98/07973 | 2/1998 |
| WO | WO 03/102382 A1 | 12/2003 |
| WO | WO 2005/019619 A1 | 3/2005 |

OTHER PUBLICATIONS

Brinkman et al.; Practical Realization of the Atkinson Cycle as an Efficient Combustion System for SI Engines; Technische Universitat Graz, Large Engines Competence Center (LEC); Sep. 22, 2005; pp. 199-217; Article in German with English Abstract.
O'Flynn et al.; "Load Control of a High Compression Ratio Engine by the Use of Variable Valve Timing;" University of Sheffield, England; Ford Motor Company; 1991; pp. 95-102.
Shiga et al.; "An Experimental Study on the Effect of More Expansion Cycle in a Spark-Ignition Engine Utilizing either Early- or Late-Closing of Intake Valve;" Seoul FISITA World Automotive Congress; No. F2000A028; Jun. 12, 2000; pp. 1-6.
Takaoka et al.; "Super High Efficient Gasoline Engine for the Toyota Hybrid System;" Toyota White Paper; Jan. 1998; pp. 2-16.
International Search Report dated Jun. 26, 2007.
Prof. Dr.—Ing. Ulrich Spicher; XP-002664112; Drehzahl und Kolbengeschwindigkeit; Jan. 2002; pp. 16 and 17.
RAM Senior BHPian (Team BHP); XP-002664111; Jan. 2006; 1 page.
Charles Fayette Taylor, "The Internal-Combustion Engine in Theory and Practice" In: "The internal-Combustion Engine in Theory and Practice", Jan. 1, 1994 (Jan. 1, 1994), The M.I.T. Press, Cambridge, Massachusetts, XP055059486, p. 422.
European Examination for Application No. 06808649.5 dated Apr. 22, 2013.
Extended European Search Report for Application No. 11165673.2 dated Sep. 9, 2015.
International Search Report for Application No. PCT/GB2006/004373 dated Jun. 26, 2007.

(56) References Cited

OTHER PUBLICATIONS

Korean Office Action for Application No. 10-2015-7035309 dated Feb. 16, 2016.
Ram Senior Bhpian, "Is it possible to increase the compression ratio?", Internet Citation, May 9, 2006, p. 1, XP002664111, Team-BHP.com, Retrieved from the Internet: <http://www.team-bhp.com/forum/technical-stuff/9447-possible-increase-compression-ratio.htm> (Printed Aug. 3, 2016).
Korean Office Action for Application No. 10-2017-7000626 dated Mar. 15, 2017.
European Office Action for Application No. EP11165673.2 dated Feb. 1, 2017.
Korean Office Action for Application No. 10-2017-7000626 dated Sep. 5, 2017.
Japanese Office Action for Application No. 2015-178456 dated Jul. 3, 2017.
Korean Office Action for Application No. 10-2015-7035309 dated Feb. 6, 2018, 8 pages.

\* cited by examiner

| | Gasoline Engines | Diesel Engines |
|---|---|---|
| - Useful energy to move the car | 22-28% | 34 to 40% |
| - Lost with exhausted combustion gases | 44 to 48% | 36 to 40% |
| - Lost with cooling water | 23 to 25% | 18 to 21% |
| - Mechanical Losses | 5% | 6% |
| Total | 100% | 100% |

APPARATUS TO IMPROVE THE EFFICIENCY OF INTERNAL COMBUSTION ENGINES, AND METHOD THEREFOR

FIELD OF THE INVENTION

This invention relates to the field of reciprocating internal combustion engines such as those operating using the 'Air Standard Otto Cycle', or 'Air standard Diesel Cycle'. It also relates to modifications to such engines to improve their efficiency.

BACKGROUND OF THE INVENTION

The fundamental theoretical principles of this idea have emerged and evolved from the long and detailed study and thorough scrutiny of structure and components of the internal combustion automotive engines, operation and thermodynamics of steps (strokes) of the 'Air Standard Power Cycles', effect of each stroke and contribution to reasons of the relatively low efficiency of their operation, etc.

Gasoline car engines operating on 'Air standard Otto Cycle' have an efficiency of between 22 and 28%

Diesel car Engines Operating on 'Air standard Diesel Cycle have an efficiency of between 36 and 42%.

Large engines such as marine units have a higher efficiency which can reach 50%.

However, two-stroke engines, have a lower efficiency which is seldom above 22%.

A major portion of the energy released in gasoline and diesel engines is lost due to the hot exhaust gases and to the cooling water or cooling air used to cool the engines.

Design, structure and construction materials of the gasoline and diesel conventional engines have been continuously studied and developed for over 100 years, to obtain highest efficiency from the used fuels. Quality of fuels and the mode of operation of the two-stroke and four-stroke engines have also been developed and tuned to better control the timings and progress of each stroke and their synchronization (between different cylinders of the same engine).

Significant efforts have been made by many scientists, designers, researchers, inventors, and the like to further improve the efficiency of the internal combustion engines and many patents have been granted worldwide for a variety of claims. Many of them involve better control and timing of the operation, while others involve addition of new complicated parts and components and are difficult or very costly to implement or introduce into the existing engines. Some suggestions weaken the structure of engines and are actually not practical to implement. However, efficiency of the internal combustion engines has continued to generally remain low in terms of utilizing the released fuel energy.

Embodiments of the invention provide ways and means, which can increase extraction of the useful energy from fuels combustion and achieve higher efficiency of conventional engines, but also seek to minimise changes and modifications of their structure, construction, operation, and hence to:

minimise (or eliminate) the requirements for addition of new complicated parts or equipment, particularly moving parts;
confine and simplify the identified and potentially useful modification to the existing components, as far as possible;
minimise (or preferably with no) interference in the moving parts, mechanisms and control systems;
maximise the positive effect from operation of strokes of the current conventional engines;
be easy to introduce into the new engine with minimum cost (Preferably less or no extra cost);
be able to be introduced into the existing engines with minimum cost;
achieve highest efficiency; and
improve the 'Environmental' effect of automotive industry on atmosphere.

Embodiments of the invention modify conventional engines (both two-stroke or a four-stroke internal combustion engines) and significantly increase the efficiency and performance of those engines, and also improve the overall environmental effect of the automotive industry on environment.

Embodiments of the invention modify the cam shaft, or any alternate devices with the function of the cam shaft so that the opening and closing of the individual (and all) inlet-outlet portals (suction valves) of the involved engines, to extend (or reduce) opening of the said valves for a calculated and predetermined time, and also reduce the volume of combustion chambers by a predetermined and calculated amount.

Embodiments of the invention can either be introduced into existing engines or included in new engines and have the advantages of:

maintaining all principles of operation of the 'Power Cycle' strokes (suction, compression, power and expansion strokes) of the involved conventional or new engines;
not involving addition of any new moving part or cancelling any existing component;
maintaining the current basic design, structure and operation principles of the conventional engines;
only slightly dividing or extending the action of some of the strokes and re-arrange their operation and effect in a manner which significantly improve extraction of the useful energy from the used fuels, and hence;
requiring less water or air cooling;
not adding any extra cost to designing and manufacturing the modified new engines. It may actually cost less after mastering the design and construction of the modified engines and reducing the need for large and costly cooling systems, exhaust systems, less fuel consumption, less need to very high Octane fuels, etc.
increasing the efficiency and performance of those engines. For gasoline engines using the 'Air standard Otto Cycle' efficiency increases from about 25% to over 40%. For diesel engines using the—'Air standard Diesel Cycle' efficiency increases from about 38% to over 48%.

The modifications can be readily introduced into currently operating engines with acceptable level of costs (as compared with significant savings in the fuels and their costs), which can be confined to only replacing the existing engine cover (head) with another cover comprising embodiments of the invention.

Embodiments of the invention can also be applied to two-stroke engines and could actually increase the efficiency of those types of engines by higher margins and conservatively to above 35%, with huge improvement of their environmental effect.

Embodiments of the invention allow modified engines (gasoline and diesel) to operate with 50% to 60% of the required fuel of unmodified engines, while they achieve more than 85 to 95% of the power, as compared with the situation if the same engine is operated on conventional mode with 100% fuel. Embodiments of the invention achieve this by creating conditions of extended expansion ratio of the combustion gases and subsequently reducing pressure and temperature of the exhaust gases from the current levels of over 0.55 M Pascal (abs) (5.5 Bar) to less than 0.2 M Pascal (abs) (2.0 Bar) and the exhaust temperature from the current levels of over 1300 K to less than 1000 K.

According to a first embodiment of the present invention, there is provided apparatus for controlling the volume of air inside a combustion chamber and cylinder of an internal combustion engine, comprising an inlet-outlet portal having open and closed states and connected to an air source; and combustion chamber with reduced volume; wherein the inlet-outlet portal is controlled, when open, to permit air to enter the combustion chamber and cylinder and when closed to prevent air from entering or exiting the chamber and cylinder, in which the volume of air located inside the chamber and cylinder when the inlet-outlet portal closes, is less than the volume of the combustion chamber and cylinder defined when the piston is at the bottom dead centre (BDC) position inside the cylinder when the inlet-outlet portal is closed. This embodiment has particular application to engines in which fuel is injected into combustion chamber separately from the air taken into the combustion chamber and cylinder during the intake stroke. Preferably the portal closes during the intake stroke when the piston head has moved to a position of between substantially 40% to substantially 70% of the distance from the top dead centre position towards the bottom dead centre position.

According to a second embodiment of the present invention, there is provided apparatus for controlling the volume of air inside a combustion chamber and cylinder of an internal combustion engine, comprising an inlet-outlet portal having open and closed states and connected to an air source; and combustion chamber with reduced volume; wherein the inlet-outlet portal is controlled, when open, to permit air to enter and exit the combustion chamber and cylinder and when closed to prevent air from entering or exiting the chamber and cylinder, in which the volume of air located inside the chamber and cylinder when the inlet-outlet portal closes, is less than the volume of the combustion chamber and cylinder defined when the piston is at the bottom dead centre (BDC) position inside the cylinder when the inlet-outlet portal is closed. This embodiment has particular application to engines in which fuel is injected into combustion chamber separately from the air taken into the combustion chamber and cylinder during the intake stroke. Preferably, the portal closes during the compression stroke of the piston when the piston head has moved to a position of between substantially 30% to substantially 60% of the distance from the bottom dead centre position towards the top dead centre position.

According to a third embodiment of the present invention, there is provided apparatus for controlling the volume of air and non-combusted fuel mixture inside a combustion chamber and cylinder of an internal combustion engine, comprising an inlet-outlet portal having open and closed states and connected to air and non-combusted fuel source(s); and combustion chamber with reduced volume; wherein the inlet-outlet portal is controlled, when open, to permit air and non-combusted fuel mixture to enter the combustion chamber and cylinder and when closed to prevent air and non-combusted fuel mixture from entering or exiting the chamber and cylinder, in which the volume of air and non-combusted fuel mixture located inside the chamber and cylinder when the inlet-outlet portal closes, is less than the volume of the combustion chamber and cylinder defined when the piston is at the bottom dead centre (BDC) position inside the cylinder when the inlet-outlet portal is closed. This embodiment has particular application to engines in which an air-fuel mixture is taken into the combustion chamber and cylinder during the intake stroke of the engine. Preferably the portal closes during the intake stroke when the piston head has moved to a position of between substantially 40% to substantially 70% of the distance from the top dead centre position towards the bottom dead centre position.

According to a fourth embodiment of the present invention, there is provided apparatus for controlling the volume of air and non-combusted fuel mixture inside a combustion chamber and cylinder of an internal combustion engine, comprising an inlet-outlet portal having open and closed states and connected to air and non-combusted fuel source(s); and combustion chamber with reduced volume; wherein the inlet-outlet portal is controlled, when open, to permit air and non-combusted fuel mixture to enter or enter and exit the combustion chamber and cylinder and when closed to prevent air and non-combusted fuel mixture from entering or exiting the chamber and cylinder, in which the volume of air and non-combusted fuel mixture located inside the chamber and cylinder when the inlet-outlet portal closes, is less than the volume of the combustion chamber and cylinder defined when the piston is at the bottom dead centre (BDC) position inside the cylinder when the inlet-outlet portal is closed. This embodiment has particular application to engines in which an air-fuel mixture is taken into the combustion chamber and cylinder during the intake stroke of the engine. Preferably, the portal closes during the compression stroke of the piston when the piston head has moved to a position of between substantially 30% to substantially 60% of the distance from the bottom dead centre position towards the top dead centre position.

Preferably, the inlet-outlet portal comprises an inlet-outlet valve.

According to a fifth embodiment of the present invention, there is provided an internal combustion engine comprising: at least one cylinder; at least one piston; a combustion chamber with reduced volume connected to the or each cylinder; at least one inlet-outlet portal for each combustion chamber having open and closed states and connected to an air or air and non-combusted fuel sources; a rotating cam to control each inlet-outlet portal; in which the cam is offset with respect to the bottom dead centre position of the or its respective piston.

According to a sixth embodiment of the present invention, there is provided an internal combustion engine comprising a substantially incompressible member located inside the combustion chamber of an internal combustion engine for reducing the volume of the internal combustion engine.

BRIEF DESCRIPTION OF THE DRAWINGS

A preferred embodiment of the present invention will now be described with reference to the accompanying drawings in which.

DETAILED DESCRIPTION OF THE PREFERRED EMBODIMENTS OF THE INVENTION

Figure 1:
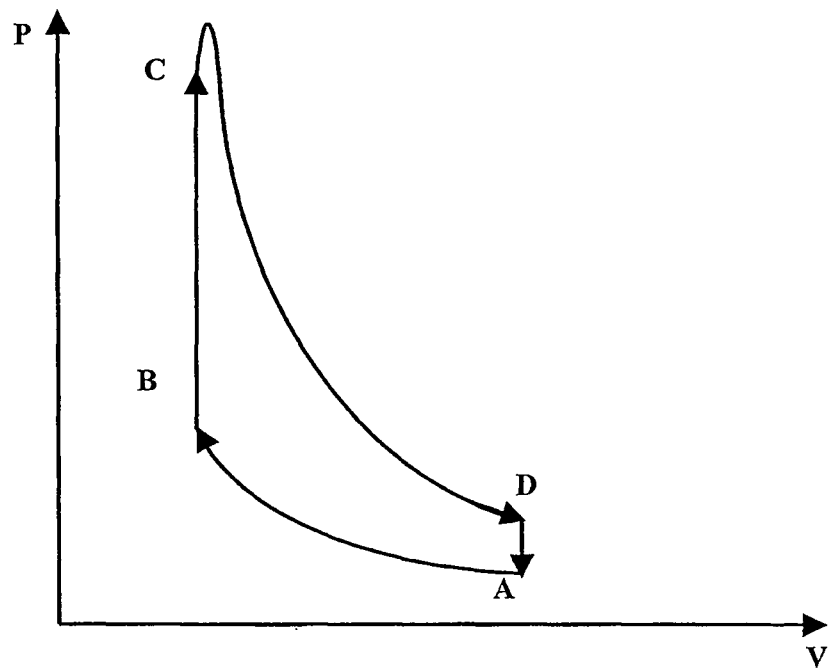
FIG. 1 shows the schematic P-V diagram of the 'Air Standard Otto Cycle'.

Referring to FIGS. 7, 8, 9, 9a, 10, 11 and 12 of the drawings, embodiments of the invention may comprise an engine which comprises a piston 1 housed within a cylinder 3. However embodiments of the invention can be used to modify existing engines as well as converting conventional engines to operate according to embodiments of the invention, and so need not contain all the features of the engine.

The piston 1 is housed within the cylinder 3 so that the piston 1 is free to move within the cylinder. The piston is pivotally connected a liver 5 connection, which is in turn pivotally connected to a crankshaft (not shown). This connection of the piston 1 to the crankshaft converts the reciprocating motion of the piston within the cylinder to rotary motion of the crankshaft. This connection also limits the movement of the piston 1 within the cylinder between a position in which the piston head 8 (the face of the piston exposed to the combusted fuel or fuel and air) is furthest away from the crankshaft. This position is known as Top Dead Centre (TDC). The position of the piston head 8 within the cylinder such that it is closest to the crankshaft is known as Bottom Dead Centre (BDC). In reciprocating combustion engines, TDC defines the volume of the combustion chamber, and BDC defines the volume of the combustion chamber plus the volume of the cylinder. The piston is free to travel from the Bottom Dead Centre Position (BDC) to the Top Dead Centre Position (TDC) within the cylinder.

The seal between the piston and cylinder must be sufficiently good so that expanding combusted gases (during the expansion stroke of the engine as the piston moves from TDC to BDC) cannot escape between the piston and cylinder joint. Furthermore, the seal between the piston and cylinder must be sufficiently good so that it can contain the air or air and fuel mixture as this is compressed by the piston in the cylinder during the compression stroke of the engine as the piston moves from BDC to TDC.

The cylinder has a working volume which is equal to the volume traced out by the piston head as the piston head moves between BDC and TDC. Therefore the working volume of the cylinder will be the cross sectional area of the cylinder, for example the area of a circle if the cylinder has a circular cross section, multiplied by the distance between TDC and BDC. The volume of the cylinder is usually used as a measure of the power of the engine.

One end of the cylinder 3 is connected to a combustion chamber 7. The combustion chamber is the volume into which air or air and non-combusted fuel is compressed when the piston reaches the TDC position. The combustion chamber has at one end an inlet-outlet portal 9. Preferably the inlet-outlet portal comprises an inlet-outlet valve. The inlet-outlet portal has open and closed states and is connected to an air or air and non-combusted fuel source(s) via a pipe 9 preferably a suction pipe. Typically, if the inlet-outlet portal is connected to an air and fuel source, there will be one source for the air and a different source for the fuel. The two components will then be mixed before being supplied to the suction pipe. Also provided at one end of the combustion chamber is an exhaust valve 11, shown in FIG. 7 in the open position, and a spark plug 13. The exhaust valve 11 is connected to an exhaust pipe 15 so that combusted gas can be removed from the combustion chamber 7. Usually, cams 17 mounted on a camshaft 19 will control the inlet-outlet portal 9 and exhaust valve 11. However, any other apparatus may be used to control the opening and closing of the inlet-outlet portal 9 and exhaust valve 11.

Figure 2:
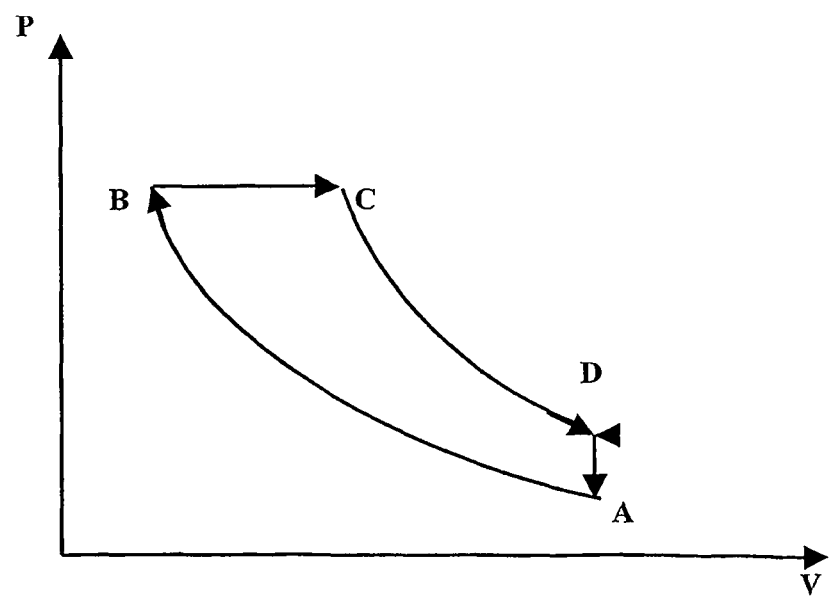
FIG. 2 shows the schematic P-V diagram of the 'Air Standard Diesel Cycle'

Embodiments of the invention modify the current design and operation of the reciprocating combustion engines, particularly, internal combustion engines (2 stroke or 4 stroke) of piston and cylinder type, operating on the principles of 'Air Standard Power Cycles' such as 'Air Standard Otto Cycle' FIG. 1, or 'Air standard Diesel Cycle' FIG. 2. The said engines may use any of the fuels as the source of energy such as: natural gas, LPG, gasoline, kerosene, diesel fuel, light or heavy vacuum fuel, residue fuel, alcohol, bio fuel, hydrogen, combination of fuels or any other type of fuels. These are referred to as fuel. The modifications allow repeated operation of all the strokes of a full power cycle, for example four strokes (successions of: suction, compression, expansion and exhaustion strokes) in a manner which will result in the improved extraction of useful energy (thermal or mechanical) from the combusted fuels and thus improve efficiency and performance of these types of engines. In order to achieve this, embodiments of the invention modify conventional engines in two ways.

The piston and cylinder will usually be of circular section when viewed along the axis of movement of the piston. However, any shaped piston and cylinder could be used, for example oval or other shape.

Modification No. 1

Embodiments of the invention change (modify) the existing cam shaft, by increasing (extending) the circular span of the mechanism of the cam shaft (metal humps) or any alternate devices with the function of the cam shaft, in positions that control the opening and closing of individual inlet-outlet ports (suction valves) of the involved engines. Note that only the cams actuating the inlet-outlet ports need to be modified, and the cams actuating exhaust ports remain unmodified. The cams will normally be mounted on a camshaft. The modified cam comprises a portion which is substantially oval in cross section. Preferably, the cross section of the cam is substantially that of a Cartesian oval.

The modification should be such to extend opening of each inlet-outlet port for the duration of the movement of the corresponding piston as follows:
  a—Open Inlet-outlet port when the corresponding piston is at the Top Dead Center (TDC), (start of the 'Suction Stroke')
  b—Keep inlet-outlet port open, while the piston moves from TDC to Bottom Dead Center (BDC).

Figure 8:
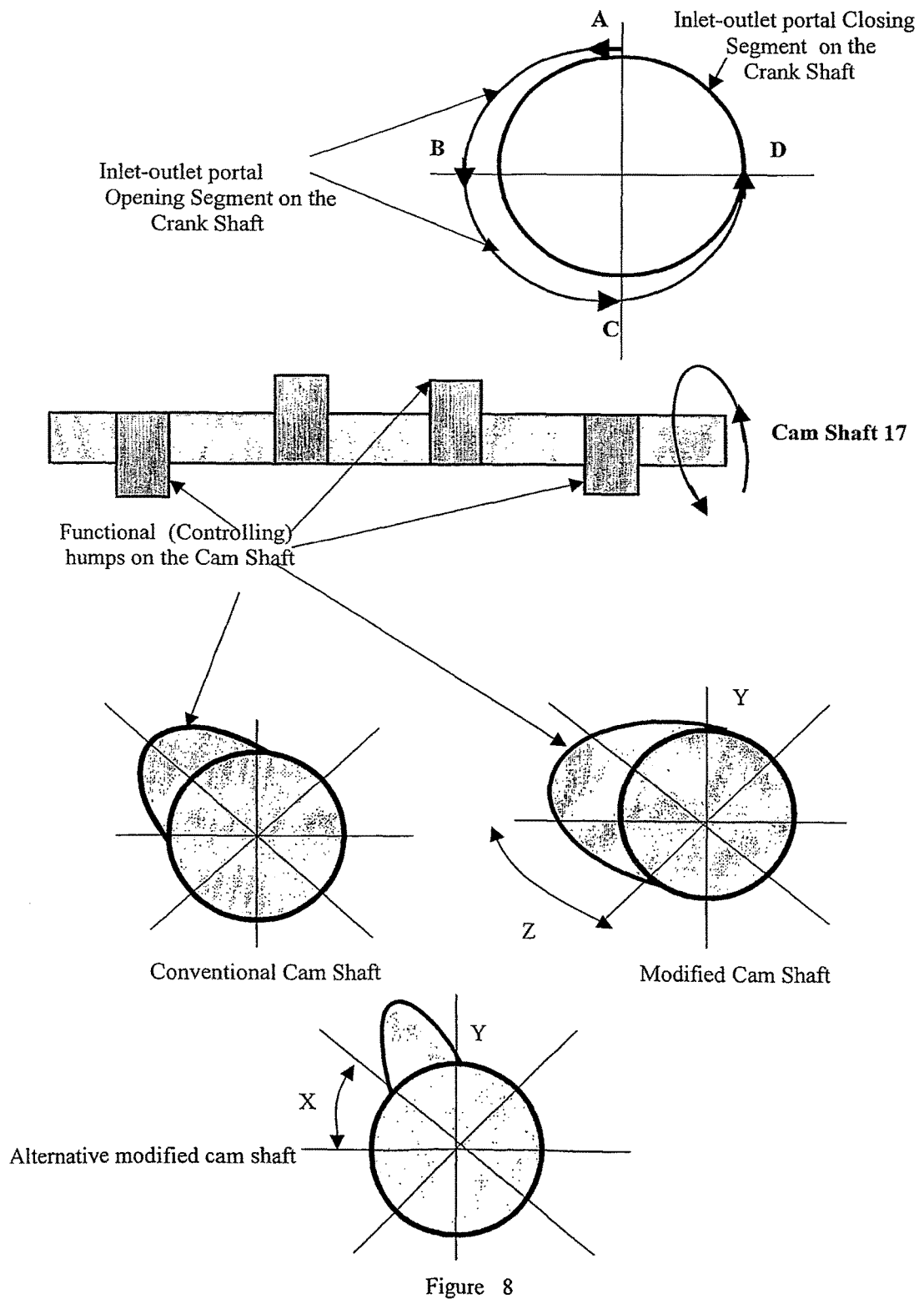
FIG. 8 shows the schematic diagram showing the required design modifications of the cam shaft and timing of opening of the inlet-outlet portal.

This movement of the piston will fill the said cylinder with air-fuel mixture, or just air in cases of injection type fuel supply, and in the case of pressure charging air-fuel mixture, opening of the inlet-outlet port will allow feeding the cylinder with air-fuel mixture. The air will normally comprise atmospheric air, which has a composition, at 15 degrees Celsius and one atmosphere pressure, of approximately 78% Nitrogen, 21% Oxygen, 0.9% Argon, and less than 0.1% carbon dioxide, Neon, Methane, Helium, Krypton, Hydrogen and Xenon in descending quantities by volume. However, other compositions of air can be used provided they comprise at least a proportion of Oxygen.
  c—Continue to keep the inlet-outlet port open while the piston had reached the BDC and turned to move back toward the TDC and covers a distance of, ideally but no necessarily, 30% to 60% of the distance between the BDC and TDC, This movement of the piston will evict a proportional volume of air-fuel or just air from the cylinder through the still opened inlet-outlet port back into the air-fuel supply pipe. When cams are used to actuate the inlet-outlet portal, this is achieved by extending the cam as shown in the modified cam in FIG. 8, so that it is offset from the BDC position of the piston. In this way, the inlet-outlet portal is controlled so that it is open for at least a portion of the first part of the compression stroke so that air or air and fuel mixture exits the combustion chamber and cylinder through the inlet-outlet portal. As shown in FIG. 8, the modified cam is extended so that as it rotates clockwise, the extended hump of the cam shown as Z will force the inlet outlet portal to remain open as the piston moves from BDC to TDC, so that some air or air and fuel exits from the combustion chamber and cylinder. In this embodiment, the modified cam actuating the inlet-outlet portal opens the inlet outlet portal at point Y in FIG. 8, at the normal time, which will usually when the piston head reaches TDC at the end of the exhaust stroke.

Figure 7:
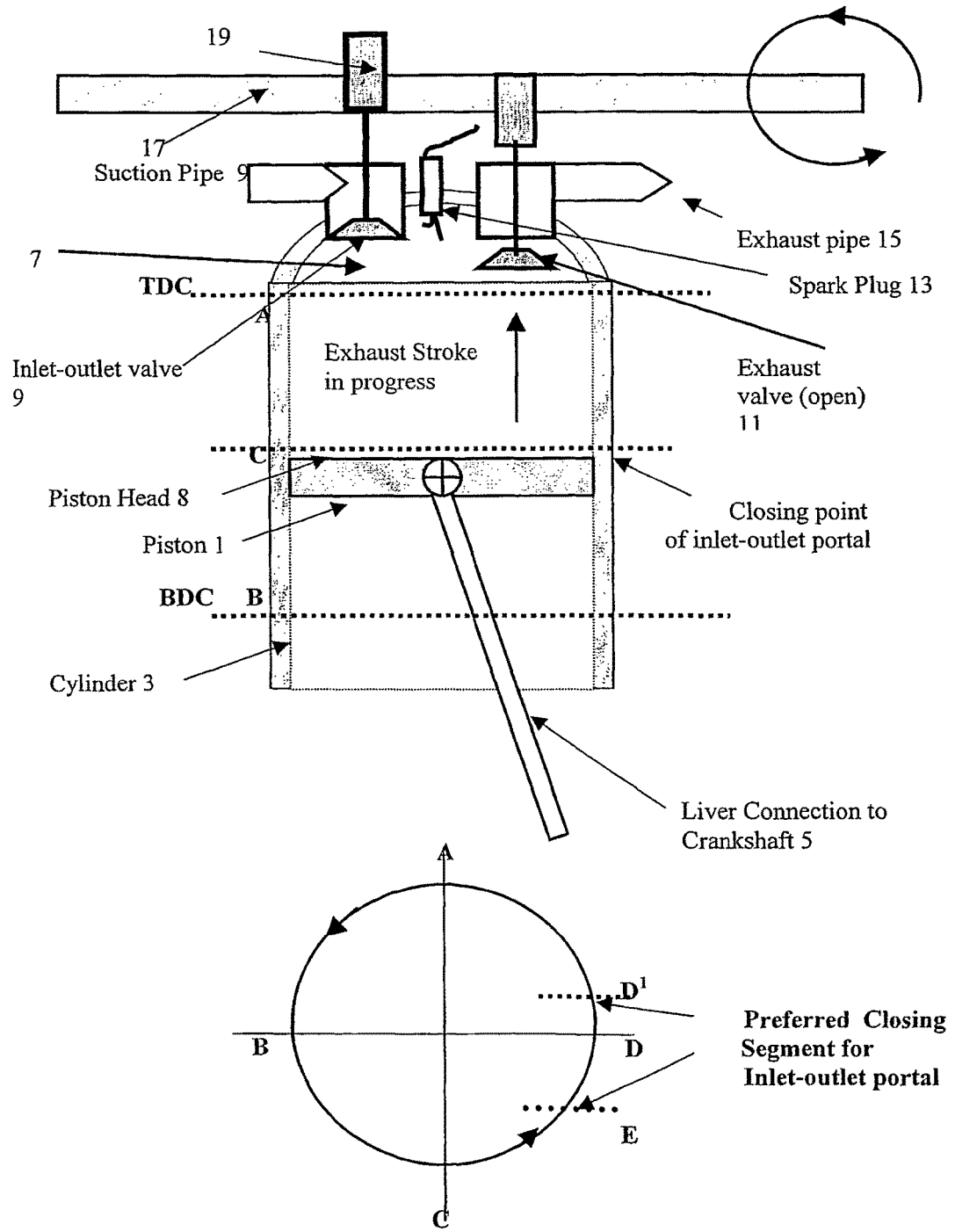
FIG. 7 shows the schematic diagram showing components of the cylinder and rotation of the crank shaft (conventional and modified)

The evicted air-fuel mixture will not have undergone a noticeable change of composition, (probably with little higher $CO_2$ content and higher temperature). This air-fuel mixture will mix with the other incoming fresh mixture being received from the carburetor or air supply pipe and air filter, and will be fed to the other cylinders of the said operating engine, which are or will be, performing the suction stroke (step),
  d—Close inlet-outlet portal when the said piston reaches the predetermined position as per point (c) above, The mechanical modification of the cam shaft (or any alternate device with the function of cam) should be able to force the closure of the inlet-outlet portal at the moment corresponding to position of the said piston at the end of covering the predetermined distance described above, which is preferably about 30% to 60% from BTC to TDC. Effect of the modified cam shaft mechanism (or alternate device) on operation of the 4 'strokes' of the involved engines, is as follows:
i—Extend the time of 'Suction Process-Stroke' of each cylinder, and for every suction stroke, and divide it into two steps which are:

i-1 Filling Step (section)
  Referring to FIG. 7 from point A (TDC) to B (BDC) the inlet-outlet portal of any cylinder will be opened by means of the cam shaft mechanism at the moment when the said cylinder starts suction stroke with corresponding piston at the Top Dead Center (TDC). Then piston will move to the Bottom Dead Center (BDC) and fill the cylinder with air-fuel mixture, or just air in cases of injection type fuel supply, and in the case of pressure charging air-fuel mixture, opening of the inlet-outlet portal will allow feeding the cylinder with the air-fuel mixture.
i-2 Eviction Step (section):
  Referring to FIG. 7, from point B (BDC) to point C, the said inlet-outlet portal will continue to be forced to stay open, while piston after reaching BDC of the cylinder (per item c above) will turn and move toward TDC and cover a predetermined distance, which could be, ideally but not necessarily, about 30% to 60% of the distance between TDC and BDC, and evict a proportional volume of air-fuel or just air from the said cylinder through the still opened inlet-outlet portal back into the air-fuel supply pipe.
ii—Divide the time and effect of the 'Compression Strokes', as compared with operation of the current conventional engine, into two steps (sections), which are:
ii-1 Eviction Step (section): FIG. 7, from point B (BDC) to point C, Same as described in item c above.
ii-2 Compression Step (section): FIG. 7, from point C to point A (TDC),
  At the moment when the modified cam shaft, or any alternate device will force the closure of (closes) inlet-outlet portal of the said cylinder (as described in item c above), the piston will continue to move from point C toward the TDC and compress air-fuel mixture, or just air in the injection type engines. When the piston reaches TDC of the cylinder, the piston compresses the full volume of air-fuel mixture or just air from the cylinder into the combustion chamber and achieves the predetermined and required 'Compression Ratio' of the air-fuel mixture, or just air.

Referring to FIG. 8, for a conventional camshaft, the time duration of operation of the suction valve is about 90 angular degrees, while the crank shaft will move 180 angular degrees. For the modified cam shaft, time duration of operation of the inlet-outlet port will be approximately 90+45=135 angular degrees, while crank shaft moves 270 angular degrees.

In this manner the inlet-outlet portal is expected to stay open for about 250 to 280 angular degrees of the full one revolution of the crank shaft, representing items a, b, c and d above. During the remainder of that revolution (80 to 110 angular degrees) inlet-outlet portal (and exhaust valve is in closed position) will be closed and piston will perform compression stage (section) of the compression stroke.
Required economic 'Compression Ratio':
  a—For 'Air standard Otto Cycle'-gasoline engines: 8 to 10
  b—For 'Air standard Diesel Cycle'-diesel engines 22 to 26

The most suitable distance for the piston to travel and achieve the desired compression ratio, will be optimised by the actual operation experience to achieve the highest efficiency, which could be less than 30% or higher than 60%.
iii—Extends 'Expansion Strokes':
  In conventional engines, the expansion ratio is usually equal to the compression ratio, and is mostly:
    a—For 'Air standard Otto Cycle'-gasoline engines: 8 to 10 b—For 'Air standard Diesel Cycle'-diesel engines 22 to 26

Hence, by dividing the working volume (length) of the cylinders of the intended engines between the TDC and BDC into 2 sections, namely:
'Eviction Section', as per item i.1 above,
'Compression Section' as per item i-2 above,
will provide and create an excellent opportunity to design and control the dividing line of these two sections in the cylinders in a manner to achieve extended economic expansion ratios, which could be:
For 'Gasoline Engines', From 15 to 22
For Diesel Engines, From 35 to 50

While high pressure of the combustion gases will continue to force the involved pistons to travel the full stroke from TDC to BDC (working length of the said cylinder) under favourable positive pressure of those combustion gases, In reality the dividing line of the eviction and compression section of cylinders of the intended engines, could be selected to provide Expansion Ratio at over 100. However, the most practical dividing line of the eviction and compression section cylinders would be such, which will yield suitable and economic expansion ratio, highest efficiency and reliable and smooth operation of the said engine.

As the cam shaft in the gasoline 4 stroke engines makes one complete revolution for every 2 complete revolutions of the crank shaft, then the turning angular relation of these shafts, for the conventional and modified engines (cases) for a full Power Cycle (suction, compression, power stroke (expansion) and exhaustion) will be as follows in the table 1 below.

Assuming the movement of piston for the eviction step from point B to Point C is equal to 50% of the stroke, (per item ii-2 above).

In a further embodiment, the same effect of eviction of air-fuel mixture into the supply pipe can be achieved by closing the inlet-outlet portal before the corresponding piston reaches the BDC by 40 to 70%, which will lead to the said piston to move the remainder of the distance to BDC under partial vacuum.

Such a case will also involve modifying the system in a different manner, particularly the cam shaft hump, which controls or actuates the opening and closing inlet-outlet ports, will be reduced rather than to be extended as mentioned above, as shown in FIG. 8 (alternative). In this way, the inlet-outlet portal is controlled by offsetting the cam from the BDC position of the piston. The portal is closed before the piston reaches the BDC position during the intake stroke of air or air and fuel. Closing the portal for at least a portion of the last part of the intake stroke means that the volume of air etc taken into the combustion chamber and cylinder when the valve closes is less than the total volume of the combustion chamber and cylinder when the cylinder is at BDC. However the modified cam still opens the portal at the beginning of the intake stroke, shown as point Y in FIG. 8.

Of course, the piston will continue to move towards the BDC position even when the valve is closed. When the piston reaches BDC, the cylinder will contain air or air and fuel, with a volume which is equal to that of the volume inside the combustion chamber when the piston is at the bottom dead centre position inside the cylinder, but the pressure of the gas contained within that volume will be at a lower, assuming that this is carried out at constant enthalpy (internal energy). Therefore, the inlet-outlet port is controlled to permit air or air and non-combusted fuel at a pressure P and temperature T to enter or enter and exit the combustion chamber and cylinder, and when closed to prevent air or air and non-combusted fuel from entering or exiting the chamber and cylinder. The volume of air or air and non-combusted fuel located inside the chamber and cylinder at the pressure P and temperature T when the inlet-outlet portal is closed (and remains closed), is less than the volume of the combustion chamber and cylinder when the piston is at the BDC position inside the cylinder.

TABLE 1

|  |  |  | Angular Rotation of Shafts Degrees | | | |
|---|---|---|---|---|---|---|
|  |  |  | Conventional Engines | | Modified Engines | |
|  | Description of Process (Stroke) | Piston Movement Ref. (FIG. 7) | Cam Shaft | Crank Shaft | Cam Shaft | Crank Shaft |
| 1- |  |  | Suction Stroke | | | |
|  | a-Filling Step | From Point A to Point B | 90 | 180 | 90 | 180 |
|  | b-Eviction Step | From Point B to Point C | — | — | 45 | 90 |
| 2- |  |  | Compression Stroke | | | |
|  | a-Conventional Engines | From point B to Point A | 90 | 180 | | |
|  | b-Modified Engines | From Point C to Point A | | | 45 | 90 |
| 3- |  |  | Expansion Stroke | | | |
|  | a-Conventional Engines | From Point A to Point B | 90 | 180 | | |
|  | b-Modified Engines | From Point A to Point B | | | 90 | 180 |
| 4- | Exhaust Stroke | From Point B to Point A | 90 | 180 | 90 | 180 |
|  | Total Degrees |  | 360 One Full Rev. | 2 × 360 2 Full Revs. | 360 One Full Rev. | 2 × 360 2 Full Revs. |

Modification No. 2

Referring to FIGS. 7, 8, 9, 9a, 10, 11 and 12 of the drawings, the volume of the combustion chamber is reduced, to restore the compression ratio. In the conventional engines, the compression ratio is the ratio of the volume of the cylinder and combustion chamber when the piston is at the BDC position to the volume of the combustion chamber when the piston is at the TDC position.

Figure 9:
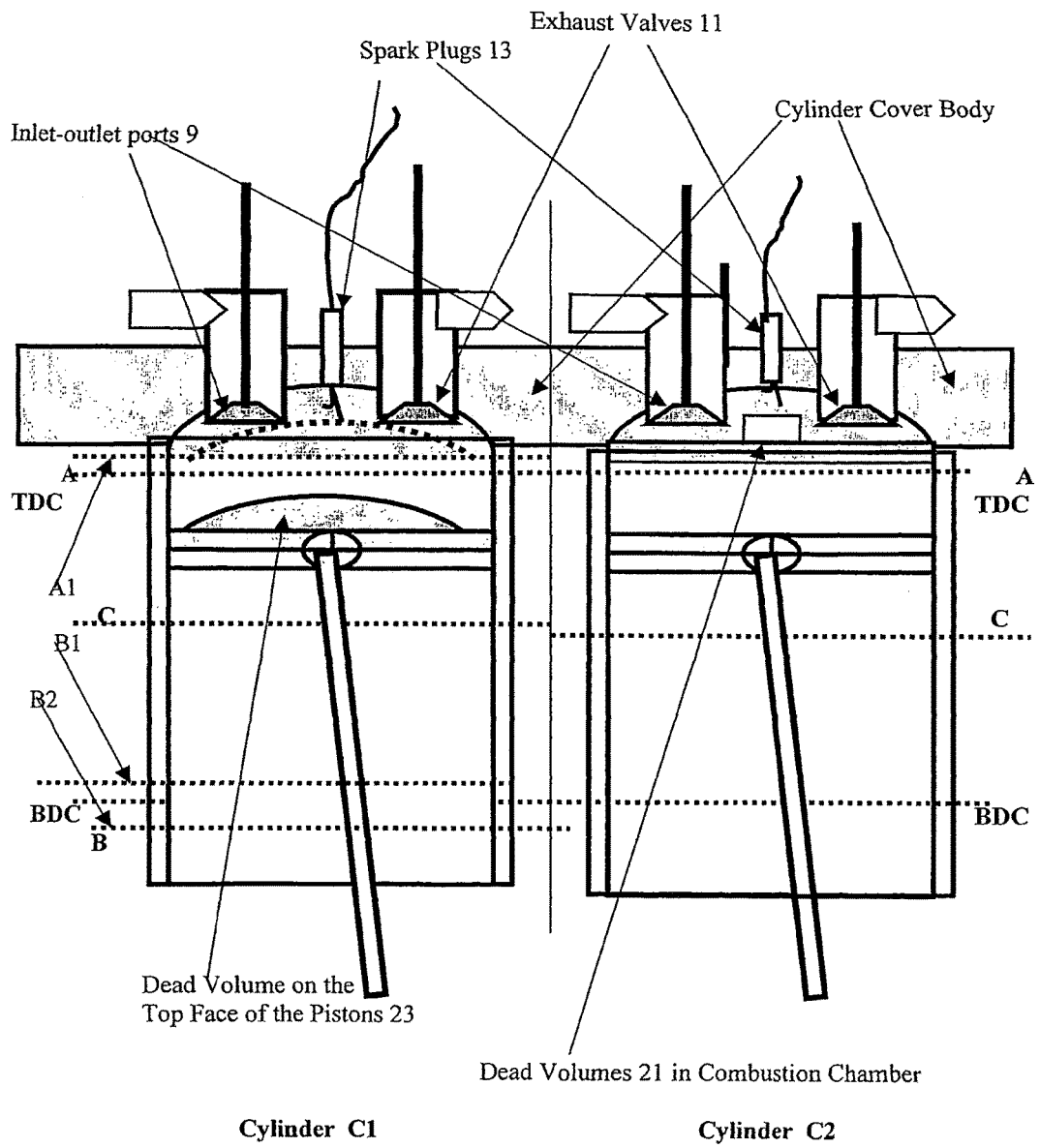
FIG. 9 shows the combustion chambers, conventional and modified cylinders.
Figure 9A:
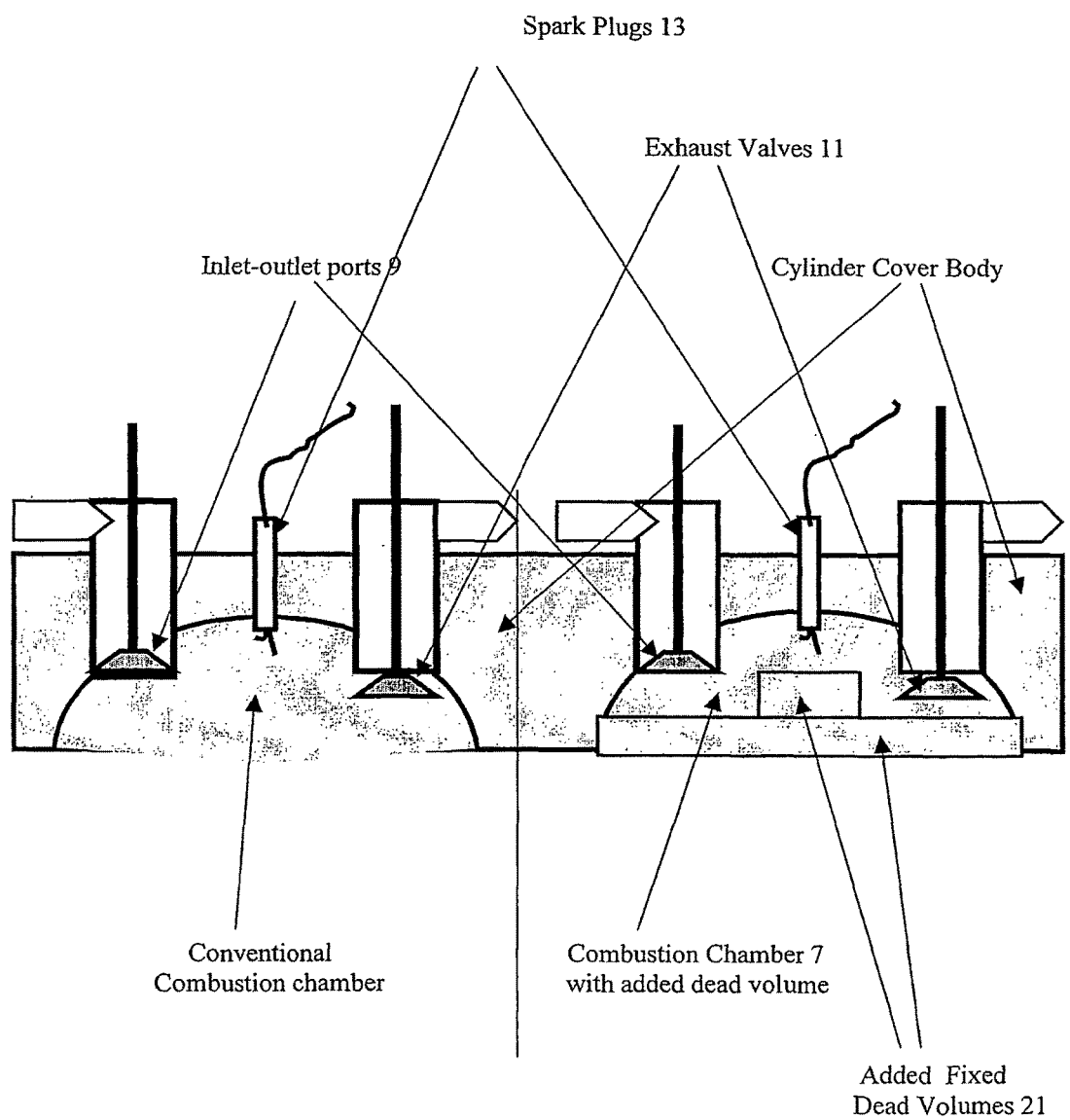
FIG. 9a shows the combustion chambers, conventional and modified cylinders.
Figure 10:
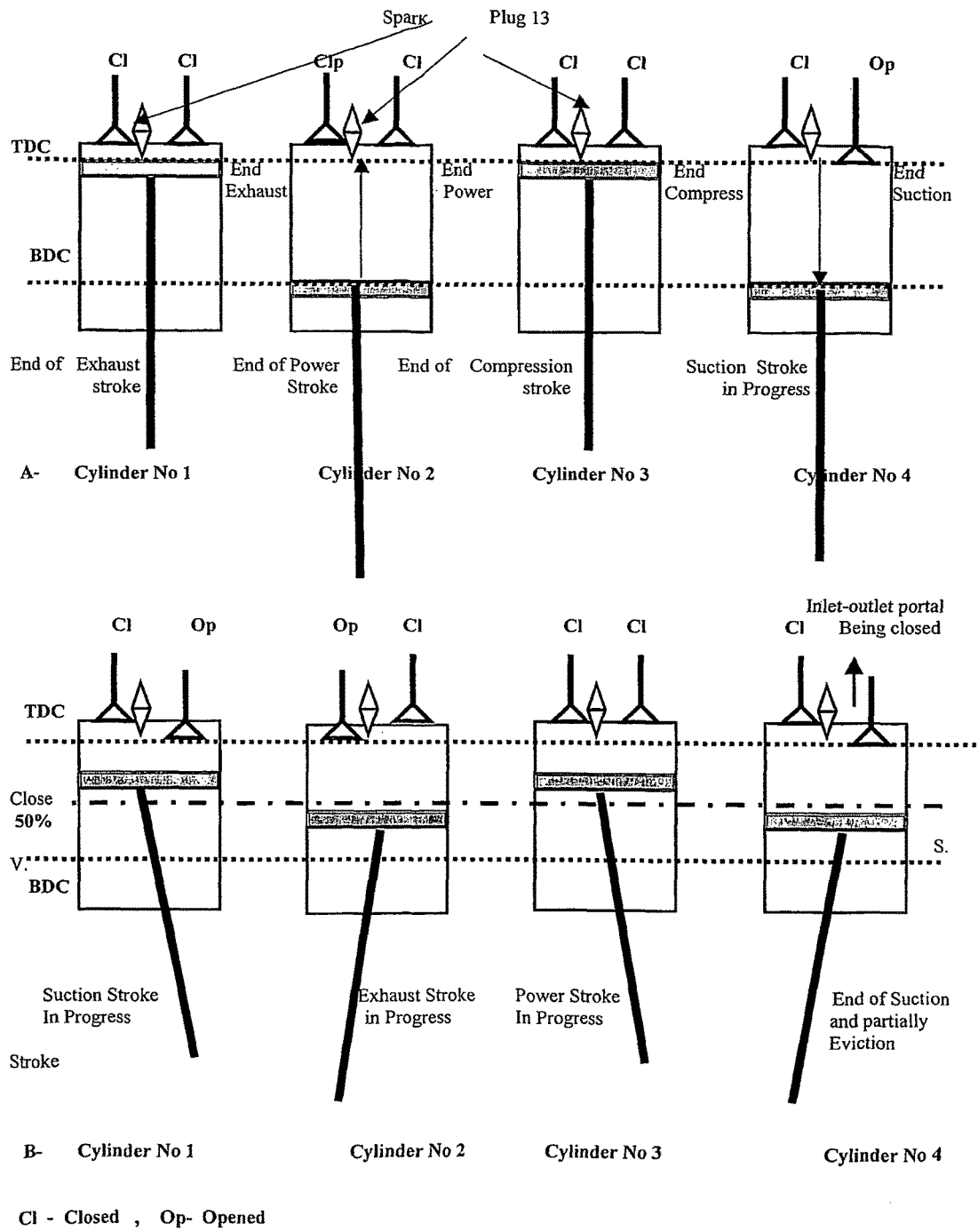
FIG. 10 shows the schematic diagram showing components of the cylinder and rotation of the crank shaft.
Figure 11:
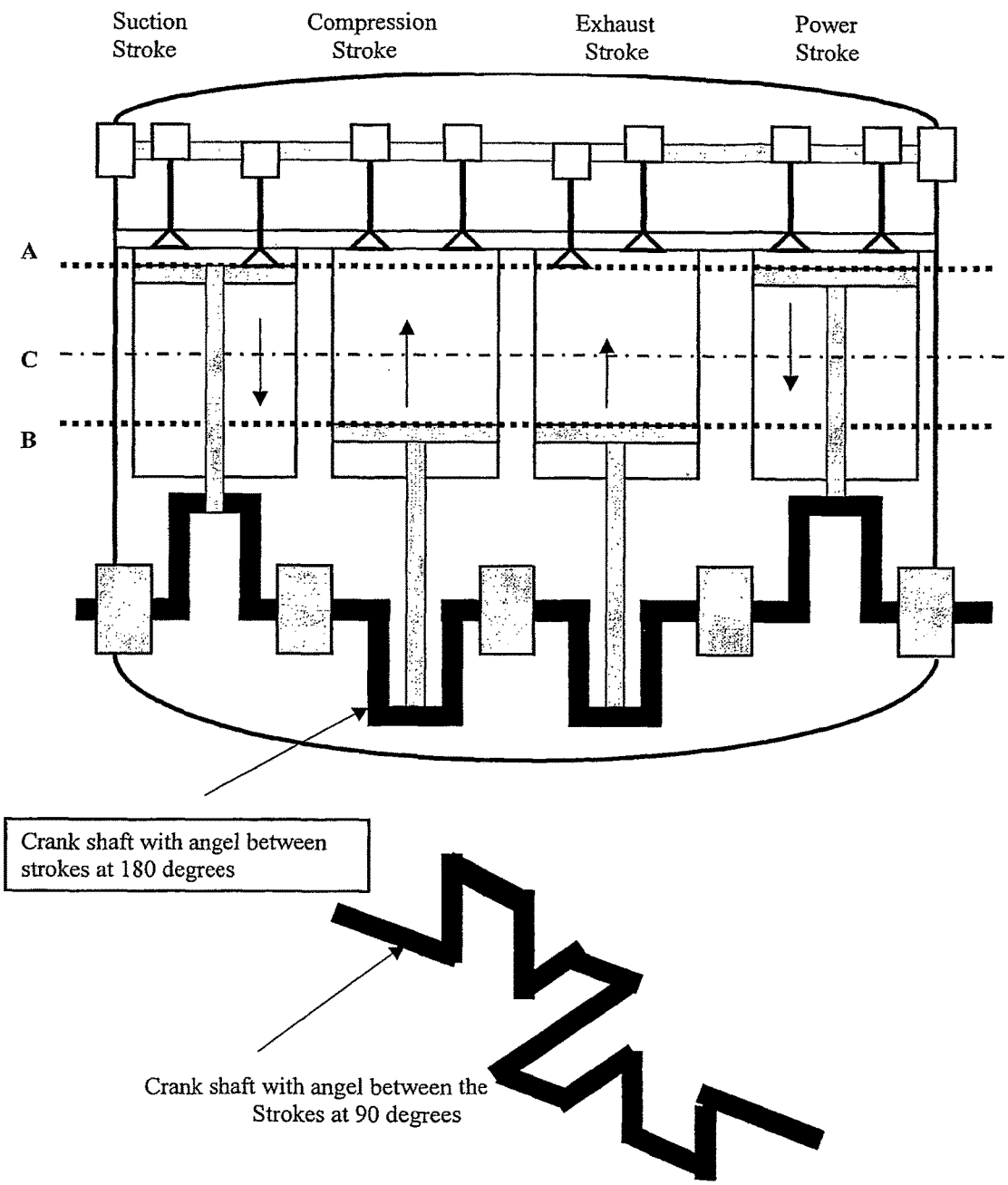
FIG. 11 shows a schematic diagram of the four-cylinder engine, and how cranks on the crank shaft are organized at 180 angular degrees from each other.

As volume of the air-fuel mixture left in the cylinders at the end of the suction and eviction process per modification No. 1 above is reduced, then a proportionate reduction in the volume of the relating combustion chamber is required. This restores the predetermined and efficient compression ratio of the air-fuel mixture in the involved cylinder (engine). Referring to FIGS. 9 and 9a, this is be achieved by means of, but not limited to, the following measures:

a—Add fixed dead volume, a substantially incompressible member 21 to each combustion chamber (cylinder C2 of FIG. 9 and FIG. 9a). The dead volume should be substantially incompressible and heat resistant at the pressures and temperatures experienced inside an internal combustion engine, for example at about 10 to 12 M Pascal and temperatures of up to 2500 K. The member should be fixedly attached to the inside of the chamber such that it does not impede the action of the piston in the cylinder.

b—Add fixed dead volume, a substantially incompressible member 23 to the top face of each piston (the piston head) (Cylinder C1), which could also change the position of TDC and BDC (to A1 and B1). This should be substantially incompressible and heat resistant at the pressures and temperatures experienced inside the internal combustion engine. The member should be fixedly attached to piston head such that it does not impede the action of the piston in the cylinder.

c—Change stroke of the involved pistons (cylinder C1) between points A1 and B2, so that the stroke is extended beyond the normal BDC and TDC positions. When the piston is at the extended TDC position, the volume of the combustion chamber will be reduced compared to the unextended position of the piston at the TDC position.

d—Combination of the above and other options.

The materials chosen should have a high Bulk Modulus (incompressibility) and resist high temperatures. Typically, most types of steel will be adequate and usually steel, with a bulk modulus of $\sim 2\times 10^{11}$ Pascal is sufficiently incompressible and resists higher temperatures. Any of these options provide the necessary conditions, which will allow to achieve the required and predetermined compression ratio for the air-fuel mixture, while the relevant piston will move a predetermined distance from the point (moment) of closure of the inlet-outlet portal (as described in the modification No. 1 above) to TDC, which could be about 30% to 60% of the distance between BDC and TDC, such as the distance from point C to TDC-FIGS. 7 and 9.

Compression ratio of the air-fuel mixture is a very important parameter in operation of 'Air Standard Cycles', and is usually selected based on the main objective to achieve the best efficiency (performance) from the fuel used in the intended engine under reasonably acceptable (controlled) operation conditions. The current levels of compression ratios are:

a—For 'Air standard Otto Cycle'-gasoline engines: 8 to 10 b—For 'Air standard Diesel Cycle'-diesel engines 22 to 26

The required volume reduction of the combustion chambers for any modified engine therefore, should be such that when any piston travels the remainder of the distance of the relating cylinder, from the position where the inlet-outlet portal of that cylinder was closed (as described above) to the TDC (travels about 40% to 70% of the full stroke), will achieve the predetermined compression ratio. The achieved compression ratio should be similar to the compression ratios of operation of the conventional engines (Air Standard Otto Cycles or Air Standard Diesel Cycles).

Determination of the required reduction to a specific combustion chambers of an engine could be estimated as follows:

Assume:
  Engine is 'Air Standard Otto Cycle', (4 cylinder and 4 stroke, gasoline type),
  Engine working size 2000 cc (cubic centimeter); Each cylinder has the working volume of 2000/4=500 cc (cubic centimeter),
  The original designed compression ratio was 9.5, for the full travel of the piston from BDC to TDC,
  Compression chamber size—volume ($V_{comp}$) for the conventional cylinder, is:

$$V_{comp} = \frac{500}{9.5-1} = 58.8 \text{ cc}$$

By closing the inlet-outlet ports at 50% distance of the relating pistons stroke from BDC to TDC for the modified engines, will mean that the said pistons have evicted about 50% of air-fuel mixture (or just air in cases of injection engines) from the corresponding cylinders back into the feeding pipe, and the cylinders are only half full of the air-fuel mixture. Hence, without the reduction of volumes of the combustion chambers, will mean that when the said pistons had reached the TDC of the relating cylinders, the achieved compression ratio will be only about half of what is required level, as follows:

$$\text{Compression ratio } (CR) = \frac{(500 \times 0.5) + 58.8}{58.8} = 5.25$$

This is not a good and efficient compression ratio for operating 'Air Standard Otto Cycle' and will result in significant energy losses, particularly with the exhausted combustion gases. The physical reduction required of size of the combustion chamber to restore the compression ratio at 9.5 for an engine of 2000 cc size with 4 cylinders of 500 cc working volume each, will need to be reduced to:

$$\text{Required Reduction } (Red.) = \frac{\frac{500}{(9.5-1)}}{2} = 29.4 \text{ cc}$$

Hence, compression ratio (C R) of the modified engine (cylinder) will be restored to:

$$CR = \frac{250 + 29.4}{29.4} = 9.5$$

This compression ratio of the modified cylinder will give a corresponding 'Expansion Ratio' in the same cylinder from TDC to BDC of the cylinder as follows:

$$\text{Modified Expansion Ratio} = \frac{500 + 29.4}{29.4} = 18$$

This is a significant increase in the expansion ratio and will provide suitable operation conditions to extract significant amount of additional energy (mechanical or thermal) from such a 'Power Cycle'.

To achieve even a higher expansion ratio of the operating engines, it will be required to proportionally and physically reduce the size of combustion chamber, and reduce the volume of the compressed air-fuel mixture in the cylinder.

For example, if it is required to have expansion ratio of 22, for the above cylinder, the required physical reductions in the volume of combustion chambers ($V_c$), will be estimated as:

$$\text{Size of each combustion chamber} = \frac{500 + V_c}{V_c} = 22$$

$V_c$—is the required volume of combustion chamber
$V_c$=23.8 cc
Required further reduction in size of the combustion chamber:
29.4−23.8=5.6 cc
Volume of the working air-fuel mixture to achieve compression ratio of 9.5 in this combustion chamber will be calculated from the following equation:

$$CR = \frac{V_{af} + 23.8}{23.8} = 9.5$$

$V_{af}$—is the working volume of air-fuel mixture in the cylinder,
$V_{af}$=202.3 cc $$\text{This amount of air-fuel mixture will be only} = \frac{202.3}{500} \times 100 = 40.5\%$$

Of the full cylinder size (volume), when operated on the conventional mode of operation (without modifications).

By restoring the compression ratio of the gas-fuel mixture in gasoline engines—say to 9.5, for only half distance of piston movement between the BDC and TDC and half of the working cylinder volume of air-fuel mixture, will allow the combustion gases to achieve an extended expansion ratio of 18 to 19, and operate (move) the piston by positive pressure of the combustion gases for much longer distance (time) as compared with the current engines, as follows;

i. Piston will perform the conventional part of the power cycle while travelling half of the cylinder distance between TDC and BDC. This section of the power cycle is performed under similar operation conditions and manner as the current conventional engines 'Air Standard Otto Cycle' in terms of:
Achieve the expansion ratio of about 9.5,
Combustion gases pressure decreases from over 7.5 M Pascal (75 Bar) down to about or little over 0.45 M Pascal (4.5 bar),
Combustion gases temperature, decreases from over 2400 K down to about 1250 K (probably about 1400 K)
Operation conditions at this point of operation of the modified engines (when the piston is at the middle part of the cylinder), correspond to the moment of operation of the conventional engines, when the piston approaches BDC of the cylinder and the exhaust valve opens to reject the combustion gases, ii. However, as the piston is approximately in the middle of the cylinder, it will continue to travel the other half of the cylinder to the BDC, and also under the continued action of high pressure of the combustion gases (very favourable conditions), which will expand further for another expansion ratio of about 8.5 to 9.5 (or even to 12). This will help to extract significant amount of additional useful mechanical energy from the combustion gases and improve the overall engine efficiency and performance.

Pressure and temperature conditions of the combustion gases at the start and the end of this section of the expansion stroke are expected to be as follow:
Pressure, Start: Over 0.45 M Pascal, End: Down to about 0.15 M Pascal,
Start, Probably over 0.6 M Pascal
Temperature, Start: Over 1250 K. End: Down to about 950 K,
Start, Probably over 1400 K Hence, the said engine will operate on only 50% to 60% of the designed amount of the fuel, while it could be capable to achieve 85% to 95% of the designed horse power of the same engine at the same RPM, (if it was working per the conventional power cycle). This entails that the engine will be capable to move the car for which it has been designed for much longer distance per liter of the used fuel (more kms). Embodiments of the invention improve the engine efficiency by more than 30% as compared with the current operation (assuming the reference efficiency of the current gasoline engines as 100%, as will be shown in the example).

Introduction of this modification No 2, (Physical reduction of the Volume of the Combustion Chambers) into both the existing and future engines, could be achieved as follows:

Modification of Existing Vehicles,
The modifications are introduced into the existing vehicles by means of:
a—Increase Piston Stroke, FIG. 9 Cylinder C1,
It is very difficult (and could prove very costly) to modify the stroke length of the existing and operating engine, for which the travel (stroke) of the corresponding piston is already designed, in a manner to be able to provide the required compression ratio 9.5.
b—Add appropriate dead volume to the top face of each piston, which could be possible by actually replacing the pistons FIG. 9 Cylinder C1.
This measure may also not be easy to introduce due to the current design restriction and negligible gap between the TDC and the engine cover (head).
c—Instead, reduce the size of the combustion chamber (over the piston when it reaches the TDC), by adding dead volume to the existing volume of each involved cylinder, FIG. 9 Cylinder C2.
It is believed that this measure should not be a very difficult or highly costly exercise, while the engine (car) performance is expected to significantly improve (as will be shown below). Position and shape of the dead volume, such as a piece of solid metal, could be fixed inside the combustion chamber in a selected suitable position.

d—Combination of any of these options as appropriate, e—Replace the existing engine cover (head) with a new one with reduced combustion chamber volume.

Modification of the New Car Engines,

The modification issues will be more simple and straight forward. They could be included with skilful engineering designs and measures.

It is important to mention that most of the required modifications could be confined to the cover (head) part of the engine including the cam shaft modification. It is possible to just remove the engine head of the existing vehicle and perform the necessary modifications, or simply replace it with an already similar and modified engine head, and the modified car engine can be operated with significantly improved efficiency.

For the fuel injection type engines, modification of injection mechanism will be required to adjust the fuel injection per the modified operation volume of the air in the combustion chambers.

Embodiments of the invention modify current operating engines (such as gasoline or diesel engines) are not complicated, but rather simple and:

Maintain the overall engine sizes at the existing levels,

Maintain the bore and stroke of cylinders of the existing engines,

Proportionally Reduce the size of the combustion chambers (dead volume), without affecting other components of the said engines, Reduce the volume of the working air-fuel mixture in the cylinder (ideally but not necessarily, by 30% to 60%), while maintaining the compression ratio of the air-fuel mixture at the current levels, Utilize the full cylinder size for the expansion stroke (combustion gases expansion) and hence, significantly increase the expansion ratio of the combustion gases, Theoretically the expansion ratio could be made very high and as high as 100. However practically it should be optimized so that the involved engine will produce the highest mechanical and thermal efficiencies and performances and maintain the smooth operation of the engine, According to the available theoretical information, the most economic expansion ratios, are expected be:

For gasoline engines 15 to 22

For diesel engines and 35 to 50

Extract significant additional useful energy (probably over 15%) from the released energy of the fuel (in the combustion gases), which could increase the Net extracted useful energy (mechanical efficiency) from the current levels:

For gasoline engines, from the current 22% to 28%, to over 40%,

For diesel engines, from the current 36% to 42%, to over 50%>

Comparison With Existing Conventional Engines

To properly explain the novel idea and to show how the improvement in efficiency and performance of the involved 'Air Standard Cycles' is achieved, will require a detailed analysis and explanation of components and operation of a full 'Power Cycle' (for example for a 4 stroke gasoline engine) per the following steps:

i. Describe and analyse operation of the 'Air Standard Otto Cycle' which is applied to the existing conventional gasoline engines (without modification), The min principles are also applicable to the 'Air Standard Diesel Cycle' ii. Describe the modifications to the conventional engine in actual physical terms, and describe operation of the modified engine, iii. Analyse operation and performance of the modifications to the 'Air Standard Otto cycle' iv. Compare results of operation of both 'air standard power cycles',

Description and Analysis of Operating of the Existing Gasoline Engines:

Referring to the FIGS. 1, 2 and 5 to 12, it should be stressed that description of the 4 stroke gasoline engines, carburetor type operating per the 'Air Standard Otto Cycle' is well known in the automotive industry, and the following description, is mainly for the purpose of the necessary comparison between operation of the conventional engines and operation of the same engine with the modifications.

Each function of the 4 (four) strokes of the conventional engine is usually completed during a full stroke of the piston (movement of the said piston from one end of the cylinder—say TDC to the other end BDC). These strokes are:

a—Suction stroke (intake stroke):

Suction of fresh air-fuel mixture into the cylinder, as the piston moves from TDC to the BDC (or charged into, in the case of turbo and positive pressure charger), b—Compression Stroke:

Compression of the air-fuel mixture (or just air in the injection type engines) is performed to induce favourable conditions into the power cycle, which will assist in extracting the highest amount of useful energy from the combusted fuel and achieve best efficiency. This stroke is performed while the piston moves from the BDC to TDC, c—Power Stroke:

This is the most important step of the 'Air Standard Power Cycle', which converts the thermal energy of combustion air-fuel mixture into the useful mechanical work. It is performed from a point when piston is ideally placed at the TDC and both inlet-outlet portal and exhaust valves are closed, d—Exhaust Stroke:

This is a necessary step to evict the combustion gases from the cylinder to allow fresh air-fuel mixture to be brought in and perform the next cycle. This cycle is performed while piston is approaching the BDC, the inlet-outlet portal is closed and the exhaust vale will be opened in a position while the piston is approaching the BTC to allow for sufficient time to evict the combustion gases (which will significantly expand as the exhaust valve opens) with least amount of energy, Hence, piston by reaching the TDC at the end of the exhaust stroke, the full power cycle will be completed and another cycle will start immediately and in the same manner, as described in the steps a to d above. The cycles will repeat over and over during the operation of the said engine and could last sometimes for days or even years.

Efficiency of the Conventional Engines:

Due to many factors of operation of the 'Air Standard Otto Cycle' and 'Air Standard Diesel Cycle', and particularly the very high temperature of the combustion gases at the start and during the 'Power Strokes', which could reach (instantaneously) over 2300° C. (2600 K), leads to significant losses of the released thermal energy from fuel combustion. Generally the released thermal energy of the fuel is divided into two major parts, which are:

The useful energy (energy used for the purpose for which the engine is used, such as car movement, fluids pumping, etc.), The lost energy (not utilized for the purpose for which the engine is used), Ratio of the used useful energy $E_u$ to the total released energy $E_t$ expresses the engine Net efficiency as follows:

$$\eta = E_u/E_t \quad \text{(Eq. 1)}$$

Where:

$\eta$—is the engine thermal efficiency $E_u$—is the useful thermal energy, which could be used to perform the required work, $E_t$—is the total thermal energy released from the fuel consumption Current level of efficiencies ($\eta$) of the conventional 'Air Standard Power Cycle', operating under favourable conditionals, are:

'Air Standard Otto Cycle'—in the range of 22 to 28%

'Air Standard Diesel Cycle'—in the range of 36 to 42%

Figures 4, 4A:
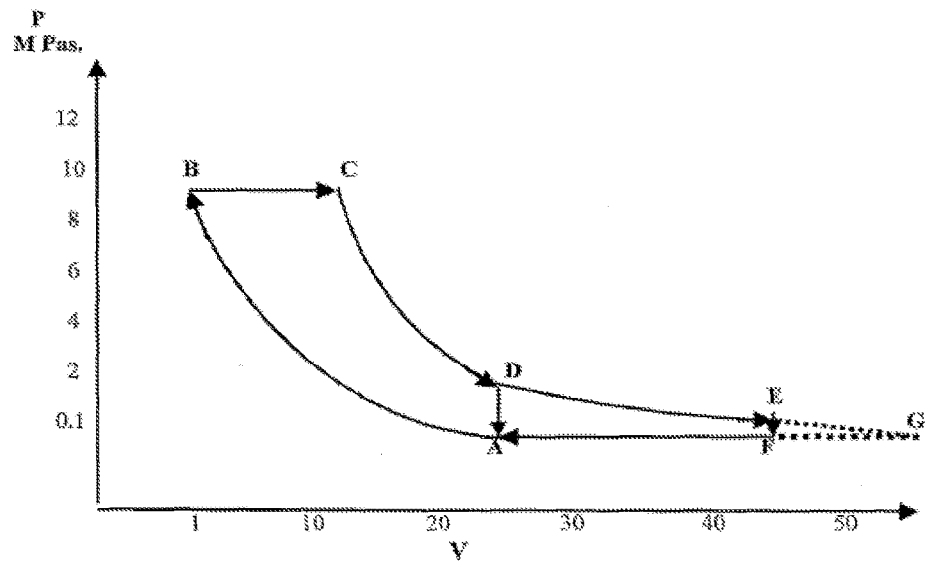
FIG. 4 shows the schematic P V diagram of the 'Air Standard Atalla Mod Cycle' for diesel engines with modification.
FIG. 4A is a table showing approximate breakdown (distribution) of the released energy between the outlets (components) in operation of the conventional engine.
Figure 5:
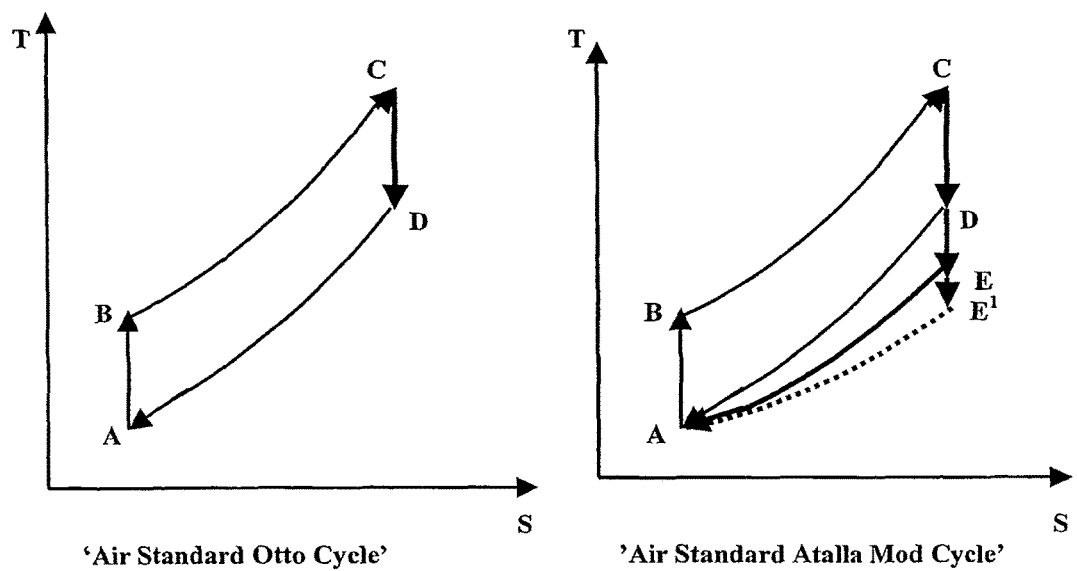
FIG. 5 shows the schematic T-S diagrams of the gasoline cycles (engines)

This means that a significant portion of the fuel energy (actually the majority portion) is lost during operation of the current conventional gasoline and diesel engines, and could not be used (for example) to move the intended vehicles, and is usually lost is the form of:

a—Residual thermal energy in the exhaust combustion gases, b—Thermal energy lost to the cooling water or cooling air c—Mechanical losses, to operate engine's parts and components, Approximate breakdown (distribution) of the released energy between the outlets (components) in operation of the conventional engine, are usually as shown in the table in FIG. 4A.

The above table shows that the major part of the released energy is lost to the exhaust gases and to the cooling water. The medium size gasoline car engines (of 1600 cc to 2200 cc) seldom achieve above 10 to 14 km per liter, while the same size diesel cars can achieve about 15 to 17 km per liter. Even in ideal conditions the manufacturers may claim little higher performance.

Hence, an amount of energy equal to moving the same car for about 35 to 40 km per liter is lost mainly to atmosphere (combustion gases and cooling water).

How Higher Efficiency and Performance is Achieved in the Modified Engine, as Compared with the Conventional Engines:

To show, explain and substantiate the expected claimed improvements of engine efficiency and performance, the case will require to analyse the involved thermodynamics, operation and work principles of both the conventional 'Air Standard Otto cycle' and the modified 'Air standard Cycle', explain the modifications and compare the achieved results.

Accordingly, the following description will include and show:

i—Explanation of operation strokes and results under current conventional conditions, ii—Explanation of the same operation strokes and results with the modifications, iii—Comparison of the results, Analysis of Operation of the Conventional 'Air standard Otto Cycle', and Comparison with Operation of the Modified 'Air Standard Power Cycle' (Engine).

Refer to FIGS. 1, 2, 3, 4, 5 and 6

Operation Steps and Thermodynamics:

Assume the compression ratio for operation of the current and future 'Air Standard Cycles' (gasoline engines) will be at 9.5 (which is a suitable and economic ratio). Comparison of each stroke of the involved engine is explained as follows:

Suction Stroke (intake stroke),

A-1 For conventional engines 'Air Standard Otto Cycle', from TDC to BDC FIG. 7, and point A on FIGS. 1, 2, 3, 4, 5 and 6, This stroke is performed to fill the cylinder with fresh air-fuel mixture and is considered mostly to require very little energy in operation and is treated as neutral stroke in terms of energy requirement or release.

B-1 For the modified engines, from TDC to BDC and back to point C FIG. 7, and point A on FIGS. 1, 2, 3, 4, 5 and 6, For the modified engines the same principle of air-fuel mixture suction (intake) into the cylinder from TDC to BDC is applicable. There is no significant difference in energy requirements.

However, when the said piston reaches BDC will turn and move back toward TDC, while inlet-outlet portal continues to be open. Hence, when piston moves toward TDC, will expel a proportional amount of air-fuel mixture from the cylinder back into the supply pipe, until the point when the inlet-outlet portal is closed, and by which time the piston will cover the predetermined distance of about 30% to 50% of the distance between BDC to TDC.

Assume the piston is filled with 50% of the full working size (stroke).

This operation also does not require much energy, and is neglected.

Compression Stroke:

The principle of compressing air-fuel mixture to the required compression ratio is applicable to both conventional engines and also to engines with the modifications.

A-1 For conventional engines, piston moves from BDC to TDC FIG. 7, which is from point A to point B on FIGS. 1, 2, 3, 4, 5 and 6

The said piston moves and performs compression stroke, while both suction and exhaust valves are closed.

B-1 For the modified engines, piston moves from point C to TDC FIG. 7, which is from point A to point B on FIGS. 1, 2, 3, 4, 5 and 6, The modification divides the cylinder itself into two distinct sections of the piston action (movement) during the compression stroke, which are:

i—Eviction Section: From BDC to point C (about 30% to 60% of the stroke-lower part of cylinder), while piston moves, it performs the eviction of a portion of air-fuel mixture from cylinder back into the air-fuel distributor (supply system) and inlet-outlet portal is still open during this section, and closes at the end of this section, ii—Compression Section: From point C (the position described, above) to TDC (upper part of cylinder), piston moves and performs the compression stroke; while both the inlet-outlet valve and exhaust valves are closed.

Amount of air-fuel mixture in the said cylinder is about 50% of the full cylinder working size (stroke)

Thermodynamics of Compression Stroke,

A—'Air Standard Otto Cycle'-Conventional Engines:

For operation of the conventional engines, compression of the air fuel mixture takes place by the movement of the relevant piston from BDC and when the piston reaches TDC, will complete the compression stroke and pushes the entire amount of the air-fuel mixture, or jut air, into the combustion chamber. This process requires significant amount of energy and causes the adiabatic rise of both temperature and pressure. Theoretical pressure increase will be according to the following equation:

$$\frac{P_2}{P_1} = \left(\frac{V_1}{V_2}\right)^K \quad \text{(Eq. 2)}$$

Where:
- $P_1$—Is the air-fuel mixture pressure at the end of the suction stroke and the start of the compression stroke, and is ideally (usually) 0.1 M Pas (1 bar),
- $P_2$—Is the air-fuel mixture pressure at the end of the compression stroke and the start of the power stroke (prior to ignition of the fuel),
- $V_1$—Is the air-fuel mixture volume at the end of the suction stroke and the start of the compression stroke (full volume of the cylinder and the combustion chamber),
- $V_2$—Is the air-fuel mixture volume at the end of the compression stroke and the start of the power stroke (volume of the combustion chamber),
- K—Is a constant and expresses $C_p/C_v$, and for air: K=1.4
- $C_p$—Is specific heat of air under constant pressure,
- $C_v$—Is specific heat of air under constant volume, Hence, for the 'Air Standard Otto Cycle' with compression ratio of 9.5, the developed pressure and temperature of the compressed air-fuel mixture at the end of the compression stroke will be:

Pressure $P_2$:

$$\frac{P_2}{P_1} = \left(\frac{9.5}{1}\right)^{1.4}$$

$$P_2 = 2.33 \text{ M Pascal (23.3 Bar)}$$

Temperature of the compressed air-fuel mixture will also increase adiabatically, and will be increasing according to the following equation:

$$\frac{T_2}{T_1} = \left(\frac{V_1}{V_2}\right)^{K-1} \quad \text{(Eq. 3)}$$

Where:
- T1—Is the air-fuel mixture (atmospheric air) temperature at the end of the suction stroke and the start of the compression stroke,
- T2—Is the compressed air-fuel mixture temperature at the end of the compression stroke and the start of the power stroke (and prior to the ignition of the air-fuel mixture), Assume the suction temperature (atmospheric Temperature) is 15° C. (288 K), then the theoretical temperature at the end of the compression stroke will be:

$$\frac{T_2}{288} = \left(\frac{9.5}{1.0}\right)^{0.4}$$

$$T_2 = 710 \text{ K}$$

As could be noticed, this stroke requires significant amount of mechanical energy to increase the pressure and temperature of the compressed air-fuel mixture. The required power is usually provided by the Power Stroke of another cylinder (or fly wheel), but will then be released as part of released power during the subsequent Power Cycle of the said cylinder, which results in a balanced situation, except for some losses.

B—Modified 'Air Standard Power Cycle'—Modified Engine:

Compression stroke (process) will be performed for engines with the modifications, in the same manner as described for the 'Air Standard Otto Cycle' with the associated corresponding energy requirement and pressure and temperature increases.

The major difference is in the actual volume of air-fuel mixture in cylinders of exactly the same stroke and bore (same size). As mentioned for the suction stroke (inlet-outlet stroke), the cylinder will be only about 50% full with air-fuel mixture of the full working stroke-plus the combustion chamber.

Hence, if the volume of air-fuel mixture in the conventional cylinder will be twice that of the air-fuel mixture for the modified cylinder and are compressed to the same compression ratio, then obviously the required energy for performing the compression ratio will also be twice for the conventional engine. However, there will be little difference in the net energy requirement, as most of the spent energy for compression is recovered during the subsequent expansion (power) stroke.

As for the pressure and temperature at the end of compression section, they will be similar to the pressure and temperature of the conventional 'Air standard Otto Cycle' as follows (if same compression ratio is applied):

| Pressure | 2.33 M Pascal (23.3 Bar) |
|---|---|
| Temperature | 710 K |

Figure 3:
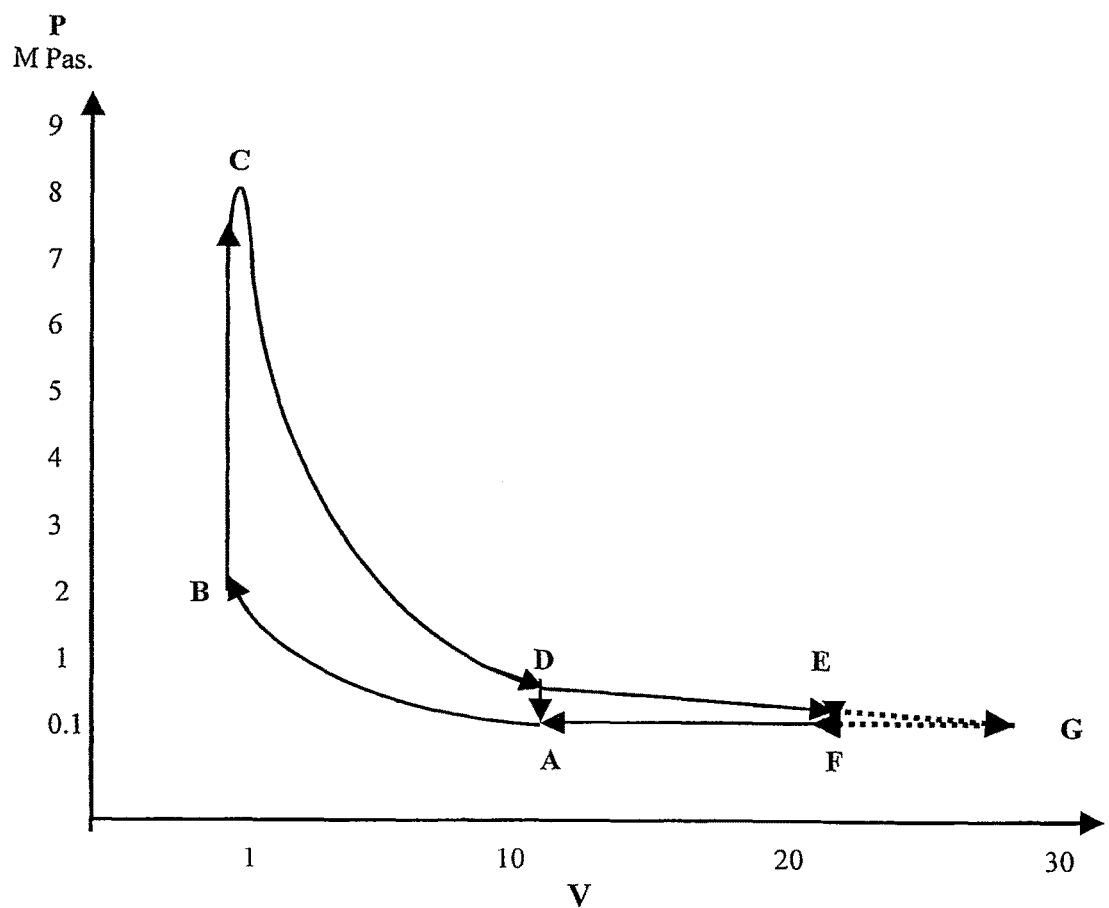
FIG. 3 shows the schematic P V diagram of the 'Air Standard Atalla Mod. Cycle' with modification.
Figure 6:
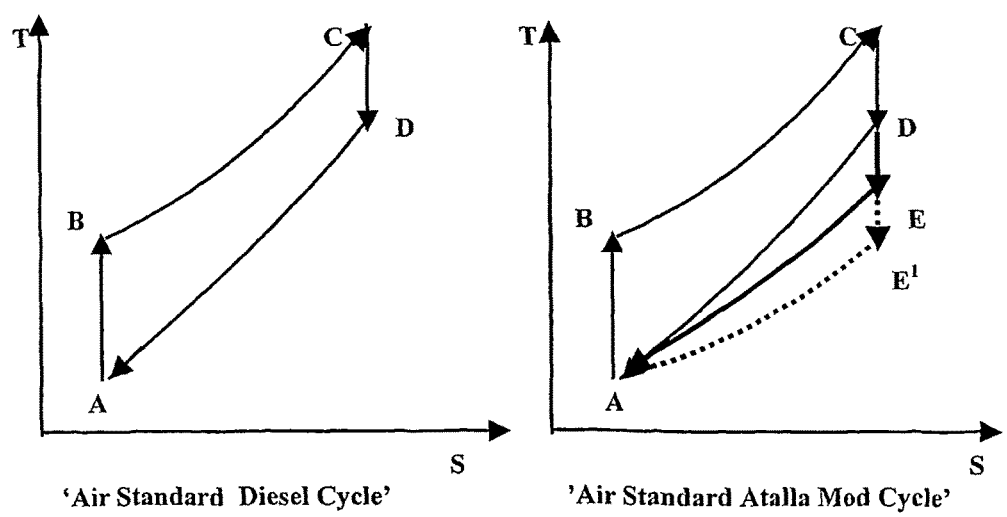
FIG. 6 shows the schematic T-S diagrams of the diesel type cycles.

Power Stroke:

For conventional engines, from point B to Point C and ends in point D on FIGS. 1, 2, 3, 4, 5 and 6, For the modified engines, also from point B to Point C to point D and ends in point E on FIGS. 3, 4 and 6, During this stroke, two simultaneous processes will take place, for both the conventional and the modified engines, they are:

Introduction of Thermal Energy from Fuel Ignition and Combustion of the Fuel,

From point B to point C for 'Air Standard Otto Cycle', FIG. 1,

From point B to point C for 'Air Standard diesel Cycle' FIG. 2

However, the major differences between 'Air Standard Otto Cycle' and 'Air Standard Diesel Cycle' are:

a—Very high combustion pressure of 'Air Standard Diesel Cycle', due to the much higher compression ratio, b—Auto Ignition of the air-fuel mixture in 'Air Standard Diesel Cycle', while the 'Air Standard Otto Cycle' has the electrical ignition system, c—In the fuel introduction (injection) type Diesel Engines, fuel injection could be controlled in a manner to sustain near a constant and predetermined pressure (close to the compression pressure) while the piston moves for about 20 to 30% of the distance from TDC to BDC.

d—This process assists to extract more useful energy from combustion gases and increase the cycle's efficiency.

Amount of fuel used (supplied to the engine) for the normal operation of 'Internal Combustion Engines' (for speeds of 70 to 100 km/h) is such to produce about 2300 to 3260 Joule (550 to 780 cal) per liter of air, to achieve air to fuel ratio of about 16.5 to 19).

A—For 'Air Standard Otto Cycle'—Conventional Engine:

For analysis of this 'Power Cycle', it is assumed:

a-1 Ignition of the air-fuel Mixture will be initiated by the action of the cam shaft and the spark plug,
a-2 Ignition (combustion) of the air-fuel mixture and release of energy is instantaneous process,
a-3 The above process takes place at constant volume (within the combustion chamber, volume),
a-4 The specific heat of the combustion gases at 1.15 Joule (0.275 cal) per gram per one degree ° K at temperature of 750 K plus,
a-5 Density of air-fuel mixture (gases) at 1.14 g/Liter,
a-6 The calorific value of the supplied fuel at 46,872 Joule (11200 cal) per gram,
a-7 Supplied energy is 2720 Joule (650 cal) per liter of air at normal conditions, This energy supply to the intended engine is normally related to the weight ratio of air to hydrocarbon fuel mixture at:

$$\frac{\text{Air}}{\text{Fuel}} = \frac{\left(\frac{46,872}{2720}\right) \times 1.14}{1} = \frac{19.64}{1}$$

This rate is relatively high as compared with the ideal ratio of air to fuel of: (16.0 to 16.5)/1; which provides:
Better economic combustion conditions of the fuel consumption.
Excess oxygen in the exhaust gases at about 2 to 4% and Better conditions of fuel combustion.

Furthermore, the high air to fuel rate (19.64/1) will cause significant energy losses as it means heating additional amounts of air—more than 15 to 20% above the ideal rate, from 288 K to over 1200 K and exhausting to atmosphere.

The supplied thermal energy, assumed at 2720 Joule (650 cal) per liter, will raise temperature of the compressed (and combusted) gases in the combustion chamber instantaneously and very sharply. Theoretical increase of temperature from combustion of fuel in the combustion chamber ($T_{increase}$), assuming an instantaneous release of energy, will be:

$T_{increase} = 2720/(1.150 \text{ joule/g·K} \times 1.14 \text{ g/l}) = 2075 \text{ K}$ Where: 1.150 is the specific heat of air joule/g·K.
1.14 is the air density at 298 K Overall combustion gases temperature (theoretical) at the end of the full combustion of fuel $T_{th\ com}$, assuming ideal conditions, will be:

$T_{th\ com} = 710 + 2075 = 2785 \text{ K}$

Note: Theoretical ideal temperature ($T_{th\ id}$) under conditions of ideal air to fuel ratio of 16, will be significantly higher and over 3200 K:

Temperature increase of the combustion gases in the combustion chamber will result in the pressure increase, per the ideal gas equation, under constant volume V:

$P_2/P_3 = T_2/T_3$, (Eq. 4)

Where:
$P_3$—is the pressure of the combustion gases after ignition of the air-fuel mixture and transfer of the full theoretical released heat to those gases,
$T_3$—is the temperature of the combustion gases after ignition of the air-fuel mixture and transfer of the full theoretical released heat to those gases, $2.33/P_3 = 710/2785$ $P_3 = 9.13$ M Pascal (91.3 Bar)

Hence, the theoretical pressure and temperature after fuel ignition and start of the 'Power Stroke' of the conventional 'Air standard Otto Cycle' will be:

| i. | Pressure | 9.13 M Pascal |
| ii. | Temperature | 2785 K |

However, from the practical experience of operation of 'Internal Combustion Engines', both the combustion gas temperature and pressure are significantly lower than these levels, because of:
 i—Exact timing (tuning) of the ignition moment, (preferably little before the piston reaches the TDC) is difficult to maintain effectively,
 ii—Time required to complete the fuel combustion, (preferably very fast and while the piston has just passed the TDC and starts to move to the BDC),
 iii—Heat transfer from the very hot gases (temperature over 2400 K) to cylinder's walls (metal) and the cooling water or air,
  This is an unavoidable factor, and all the attempts are to minimize the heat loss while maintaining the efficient and smooth operation of the engine (power cycle) rather than to eliminate it Etc.

Actual highest temperature and pressure of operation of the gasoline engines could be lower by as much as 15 to 25% than the theoretical highest values (per the 'Air Standard Otto Cycle'), B—Modified 'Air Standard Power Cycle'-Modified Engine:
Air-fuel ignition (or auto-ignition in the case of diesel engines), energy release and pressure increase described before, for the 'Air Standard Otto Cycle' will also be performed in the same manner for engines with the modifications.

Again the major difference is in the actual volume of air-fuel mixture in cylinders of exactly the same stroke and bore (same size). As mentioned before the said cylinder will be only about 50% full with air-fuel mixture of the full stroke—plus the combustion chamber.

As for the pressure and temperature after fuel ignition and start of the 'Power Stroke' will be similar to the pressure and temperature of the conventional 'Air standard Otto Cycle'

| Pressure | 9.13 M Pascal |
| Temperature | 2783 K |

➡ Expansion of the Combustion Gases (Power Stroke):
For conventional engine, from point C to point D, on FIGS. 1, 2, 3, 4, 5 and 6
For the modified engine, from point C to point D, and to point E on FIGS. 3, 4, 5 and 6,
The main thermodynamic difference between operation of the conventional and modified engines occur in the expansion stroke as follows.
Expansion of combustion gases for both the conventional and modified engines starts immediately after the piston had passed the TDC and moves toward the BDC. Expansion of the combustion gases will also take place adiabatically and will be per Equations 2 and 3 (mentioned before).
Assume the actual temperature at the start of the expansion stroke is 2400 K
Assume the actual pressure at the start of the expansion stroke is 7.5 M Pascal (75 Bar), A—'Air Standard Otto Cycle' Conventional Engines:
From point C to point D on FIGS. 1, 2, 3, 4, 5 and 6,
Temperature at the end of the expansion stroke (BDC) will be:

A-1 Theoretical temperature ($T_{th}$) at the end of the expansion stroke (BDC), will be:

$$\frac{2785}{T_{th}} = \left(\frac{9.5}{1.0}\right)^{0.4}$$

$$T_{th} = 1132 \text{ K}$$

A-2 However, expected temperature ($T_e$) at the end of the expansion stroke (BDC) with the assumed temperature at the start of expansion stroke (TDC) at 2400 K, will be:

$$\frac{2400}{T_e} = \left(\frac{9.5}{1.0}\right)^{0.4}$$

$$T_e = 975 \text{ K}$$

In reality, the actual temperature at the end of the expansion stroke and the start of exhaust stroke, is significantly higher (by as much as 15 to 30%) than both of these temperatures, due to the fact that combustion of the air-fuel mixture could still be in progress, while the piston is close to the BDC.

Assume: Exhaust temperature of the combustion gases is about 1250° K.

Exhausted Energy ($E_{ex}$) with combustion gases will be:

$$E_{ex} = (1250-288) \times 1.150 \text{ joule/g·K} = 1106 \text{ Joule/g (265 cal/g)}$$

Note: Specific heat of the combusted gases is expected to be little higher at higher temperatures, Percent exhausted energy=(1106/(2720/1.14))×100=46.35%

This is a very substantial amount of energy, which is lost with exhaust gases.

A-3 Theoretical pressure at the end of the expansion stroke at the point E, ($P_E$) with conventional engine, will be:

$$\frac{9.13}{P_E} = \left(\frac{9.5}{1}\right)^{1.4}$$

$$P_E = 9.13/23.4 = 0.391 \text{ M Pascal}$$

A-4 Pressure at the end of the expansion stroke at point E, ($P_E$) with the assumed pressure of 7.5 M Pascal (75 Bar) at the start of the expansion stroke (conventional engine), will be per eq. 2

$$\frac{7.5}{P_E} = \left(\frac{9.5}{1}\right)^{1.4}$$

$$P_E = 7.5/23.4 = 0.321 \text{ M Pascal (Bar 3.21 Bar)}$$

However, the actual pressure at the end of the expansion stroke $P_D$ will be significantly higher due to the very high temperature of the combustion gases at the end of the expansion stroke, and will be:

$$P_D = 1250/288 = 0.43 \text{ M Pascal (4.3 Bar)}$$

This is again a very high pressure and could perform proportionate mechanical work, if it could be beneficially utilized, particularly as it is applied to the full volume of the cylinder of combustion gases.

The modification of the engine, addresses this exact issue and try to utilize most of this available (but currently lost) mechanical work (energy), prior to expelling the combustion gases to atmosphere, as explained below.

B—Air Standard 'Power Cycle'-Modified Engine:
Points C to D then to E on FIGS. 3, 4, 5 and 6, Combustion gases continue to expand adiabatically, under controlled conditions by another 9.5 times of the size of the combustion chamber (from point D to point E on the FIGS. 3 and 4) starting from the end point of the conventional cycle expansion section. This will assist to complete combustion process of the introduced fuel and significantly reduce the exhaust temperature, as shown below:

B-1 Theoretical temperature at the end of the expansion stroke $T_{thmod}$, will be:

$$\frac{2783}{T_{thmod}} = \left(\frac{19}{1}\right)^{1.4-1.0}$$

$$T_{thmod} = 857 \text{ K}$$

B-2 Expected temperature ($T_{EXmod}$) at the end of the expansion stroke with the assumed initial temperature at 2400 K, will be:

$$\frac{2400}{T_{EXmod}} = \left(\frac{19}{1}\right)^{1.4-1.0}$$

$$T_{EXmod} = 739 \text{ K}$$

However, the real exhaust temperature will be slightly higher, due to the much longer time of combustion, and could be (conservatively) at about 850 to 1000 K.

This is a very significant reduction of the exhaust temperature of the expelled gases and the associated thermal energy. Exhausted energy with combustion gases with the modifications will be (assuming the exhaust temperature at high 950 K):

$$E_{Ex\,Mod} = (950-288) \times 1.150 \text{ j/g·K} = 761 \text{ Joule/g (182 cal/g)}$$

Percent of the exhausted energy=(761/(2720/1.14))×100=31.89%

Saved amount of thermal energy will be: 46.35-31.89=14.46%

By all measures and considerations, this is a very significant reduction in the expected exhausted thermal energy, and could be utilized usefully to move the intended vehicles.

B-3 Theoretical pressure at the end of the modified expansion (adiabatic) stroke $P_{th,mod}$, Will be:

$$\frac{9.12}{P_{th,mod}} = \left(\frac{19}{1}\right)^{1.4}$$

$$P_{thmod} = 0.146 \text{ Pascal (1.46 Bar)}$$

B-4 Expected pressure at the end of the modified expansion (adiabatic) stroke $P_{mod}$ with the assumed initial temperature at the start of expansion stroke of 2400 K, will be:

$$\frac{75}{P_{mod}} = \left(\frac{19}{1}\right)^{1.4}$$

$$P_{mod} = 0.119 \text{ M Pascal (1.19 Bar)}$$

However, the actual pressure at the end of the expansion stroke Pa will be slightly higher than both of these pressures, depending on the exhaust temperature, and conservatively could be at about 0.14 to 0.17 M Pascal (1.4 to 1.7 Bar), due to higher exhaust temperature.

On FIGS. 3 and 4 the area from point D to Point E to point F to point A and back to point D represents the additional useful energy, which will be added to the conventional engine useful energy between the point A to point B, to point C, to point D and back to point A. This area could represent a major input and will significantly improve the operation efficiency and parameters of the vehicles.

Note: For injection cars, the injection of fuel will need to be tuned also with the modification of the actual amount of air to fill 30% to 60% of the cylinder size:

Summary of the temperature and pressure for the two 'Power Cycles' at the end of expansion stroke are:

|  | Otto Cycle | Modified Power Cycle |
|---|---|---|
| i- Temperature K |  |  |
| Theoretical | 1132 | 856 |
| With assumed temperature at the Start of expansion stroke | 975 | 739 |
| Assumed operational | 1250 | 950 |
| ii- Pressure M Pascal |  |  |
| Theoretical | 0.391 | 0.146 |
| With assumed pressure at the start of expansion stroke | 0.321 | 0.119 |
| Assumed operational | 0.43 | 0.15 |
| Iii- Rejected heat with combustion gases Joule |  |  |
| With assumed exhaustion temperature | 1106 | 761 |

The above data show a significant improvement (reduction) in the temperature and pressure of the combustion gases at the end of expansion stroke and start of the exhaust stroke.

Exhaust Stroke:

A—For conventional engines 'Air Standard Otto Cycle', piston moves from BDC to TDC FIG. 7, and from point D to point A on FIGS. 1, 2, 3, 4, 5 and 6, This stroke is performed to evict the combustion gases from the cylinder to the outside environment and prepare that cylinder for the next cycle. This stroke does not require high energy demand at lower engine speeds (crank shaft) of less than 1600 revolution per minute (RPM), and also depends on the size of the exhaust valve. However as the engine speed increases with increased energy input into the engine and the resulting significant increase of residual pressure and temperature of the combustion gases at the end of the power stroke (combustion gases expansion), energy requirement to evict the combustion gases out of the cylinder increases. It is expected that by the time the engine speed reaches to about 3000 RPM, eviction process of the combustion gases may require up to 0.1 M Pascal (over 1.0 bar) pressure from the piston and crank shaft.

B-1 For the modified engines, also piston moves from BDC to TDC FIG. 7, and from point D to point E on FIGS. 3, 4, 5 and 6, Due to the significant reduction in the volume of fresh air-fuel mixture in the cylinders and the resulting significant reduction in the residual pressure and temperature at the end of the power stroke (combustion gases expansion) of the modified engines, demand for energy to evict the combustion gases will be negligible at engine speeds (crank shaft) of even over 6000 RPM.

Overall summary of operation results (data) of the two power cycles is shown in the table 2 below.

TABLE 2

Summary of results of the operation of the two types of engines.

| | Description Gasoline engine, 4 stroke | Units | Conventional Engine | Modified Engine |
|---|---|---|---|---|
| 1- | Compression Ratio | | 9.5 | 19 |
| 2- | Temperature at the end of compression stroke | K | 710 | 710 |
| 3- | Pressure at the end of compression stroke | M Pascal | 2.33 | 2.33 |
| 4- | Energy introduced joule/litre of air | Joule | 2720 | 2720 |
| 5- | Temperature at the end of fuel combustion | K | | |
| | Theoretical | Theoretical | 2783 | 2783 |
| | (Assumed) | Assumed | 2400 | 2400 |
| 6- | Temperature at the end of Expansion stroke | | | |
| | Theoretical | K | 1132 | 856 |
| | With Assumed initial temperature | K | 975 | 739 |
| | Assumed | K | 1250 | 950 |
| 7- | Pressure at the end of Expansion stroke | M Pascal | | |
| | Theoretical | | 0.391 | 0.138 |
| | with the assumed initial expansion temperature of 2400 K | | 0.321 | 0.119 |
| | With Assumed exhaust temperature | | 0.43 | 0.15 |
| 8- | Energy exhausted with combustion gases | Joule/litre | 1106 | 761 |
| 9- | Thermal efficiency | % | 53.64 | 68.1 |

The table shows significant increase of thermal efficiency of the modified engine to 68.1% as compared with efficiency of the conventional engine of 53.64%, with the increase of about 14%. Reduced temperature of the engine operation by more than 200 K will in turn reduce the energy lost with cooling water by several percents (probably by more than 5%) and will result in an overall improvement of the gasoline engines operation efficiency by over 19% (of the net energy input) as compared with current operation of the 'Air Standard Otto Cycle'. A near similar improvement in the efficiency in operation of 'Air Standard diesel Cycle' could also be expected.

(This could be tested and further improved in actual experience).

Below is the comparison of distribution of the released energy between the major outlets (components) in operation of the conventional engines and the expected distribution from operation of the modification, is as follows in table 3.

TABLE 3 comparison of distribution of the released energy.

| | | Gasoline Engines | | Diesel Engines | |
|---|---|---|---|---|---|
| | Energy outlet | Conventional Operation % | With Modification % | Conventional Operation % | With Modifications % |
| 1- | Useful energy to move the car | 22 to 28 | 40 to 48 | 34 to 40 | 45 to 55 |
| 2- | With exhausted combustion gases | 44 to 48 | 26 to 32 | 36 to 40 | 21 to 28 |
| 3- | With cooling water | 23 to 25 | 20 to 25 | 18 to 21 | 18 to 21 |
| 4- | Mechanical Losses | 5 | 5 | 6 | 6 |
| | Total | 100 | 100 | 100 | 100 |

Note:
These figures are only estimates and may be different in the actual practice. The changes are expected to be positive.

The modifications significantly increase efficiency and performance of the involved engine (even much higher than those shown in the above tables) and subsequently increase the km per liter for the automotive industry. The modifications are very useful in the operation of larger engines, such as the Diesel Power stations, which operate on light and heavy Vacuum Gasoil (ship engines) with cylinder bore and stroke of over 300 mm. The reduced temperature of the exhaustion gases and extended expansion stroke are expected to noticeably improve the engine's efficiency and performance, in terms of:

- ☛ Significant reduction in the exhaust gases temperature (probably by more than 300 K, from—say 1250 K to below 950 K)
- ☛ less heat loss to the cooling water or cooling air due to the overall significantly reduced operation temperature, while maintaining and improving the main operation parameters as compared with the conventional engine,
  Only air cooling may prove to be sufficient even for engines of 2000 cc size,
- ☛ less mechanical losses by restricting the very high pressure and temperature to the top quarter portion of the stroke (softer operation conditions),
- ☛ less requirement for cooling water or cooling air, by converting more thermal energy into the useful mechanical work,
- ☛ Less severe conditions in the exhaust pipe, due to the reduced amount of combustion gases (probably by more than 40%) and lower temperature as mentioned in item No 1 above, for the same gross horse power,
- ☛ For smoother operation of the involved engines, cranks arrangement on the crank shaft for the future 4 cylinder engine, may be arranged at 90 angular degrees from each other, as compared with the current preferred arrangement of 180 angular degrees (FIG. 11), Environment:
- ☛ Very significant reduction in the emission of $CO_2$ and other pollutants to atmosphere by the increased efficiencies of the Internal Combustion Engines, which should require much less fuel for the same net break horse power,
- ☛ Emission of significantly less harmful and incompletely combusted mater (quantity and quality) to atmosphere by allowing much more time for completing the combustion of fuels in the cylinder itself and under conditions of higher temperature,
- ☛ Hence more favourable and significantly improved environmental conditions from the operation of such engines, The modifications (when introduced into the existing cars) may slightly change engine's power, particularly in achieving very high speeds, of say over 120 km/h. However, this may be a small price to afford as compared with significant expected savings in the purchase of fuels (LPG, gasoline, diesel, etc). It may also require a little larger 'fly wheel' to ensure a continuous engine operation at low parking RPMs of—say about 750 RPM. The issue of sufficient performance (higher power and speed requirements) for the new engine, could be included directly in the designs, and should not pose a problem for expert designers.

Case with Cylinder Filled 60% at the Start of Compression Stroke:

To show the impact of a lower case of compression ratio, the same above analysis will be performed for a case when the cylinder is filled 60% at the start of compression stroke.

With 60% of the cylinder full of air-fuel mixture at the start of the compression stroke, the new compression ratio will be:

Compression Ratio=9.5+(9.5×0.6)=15.2

Temperature and pressure at the end of the compression stroke will be:

$$\frac{2400}{T_{mod}} = \left(\frac{15.2}{1}\right)^{1.4-1.0}$$

$T_{mod}$ = 808 K

The real exhaust temperature could be (conservatively) about 920 to 1000° C.,

This is a very significant reduction of the exhaust temperature of the expelled gases and the associated thermal energy. Exhausted energy with combustion gases with the modifications will be:

$E_{ExMod}$=(1000−288)×1.150 joule/g·K=820 Joule/g (196 cal/g)

Percent of the exhausted energy will be:

$E_{ExMod}$=(820/(2720/1.14))×100=34.37%

Saved amount of energy will be: 46.35−34.37=11.65%

By all measures and considerations, this is also a very significant reduction, and could be utilized usefully to move the intended vehicles.

Theoretical pressure at the end of the modified expansion (adiabatic) stroke $P_{mod}$, will be:

$$\frac{7.5}{P_{mod}} = \left(\frac{15.2}{1}\right)^{1.4}$$

$P_{mod} = 0.167$ M Pascal (1.67) Bar

This pressure is also significantly lower than the experienced pressures with conventional operation of the 'Air standard Otto Cycle' (gasoline engines).

As could be seen, from FIGS. 3 and 4, further energy extraction (mechanical) from the combustion gases (beyond 20 compression ratios) within the cylinders may prove negligible or highly costly, as the pressure of the exhaust gases could actually be reduced to less than 0.12 M Pascal abs (1.2 bar) abs with compression ratios of about 19 to 22. Actual experience may prove that this residual positive pressure will be required, which is just enough to avoid creating a vacuum inside the cylinder under low RPM (parking conditions).

These analysis show, that a significant amount of additional energy could be extracted from the combustion gases and used to perform the useful mechanical work (to move the car) as shown in the extended expansion stroke on the PV diagrams FIGS. 3 and 4.

New Power Cycle:

The 'Power Cycle' shown in the FIGS. 3 and 4, is a new type of 'Air Standard Power Cycles', which can significantly extend the expansion stroke of this Power Cycle beyond those of both the conventional 'Air Standard Otto Cycle' and 'Air Standard Diesel Cycle' and is substantially different from both of them.

This new power cycle re-organizes and re-designs the engines operation as follows:
  i—Splits the conventional suction stroke to:
    a—Filling stage,
      The moving piston from TDC to BDC will fill the cylinders with air-fuel mixture, (inlet-outlet portal is open)
    b—Eviction stage,
      When the said piston reaches BDC and fills the said cylinder with air-fuel mixture as per stage a—above, the piston will turn and starts to move toward the TDC and covers a predetermined distance of about 30% to 60% of the distance between BDC and TDC, with inlet-outlet portal still open during this section. During this stage, piston will evict a proportional portion of air-fuel mixture back into the fuel distribution (supply) pipe.
Inlet-outlet portal will be closed at the piston position corresponding to the end of the predetermined distance of 30% to 60% of the full distance between BDC to TDC.
  ii—Splits the conventional compression stroke to:
    a—Eviction stage, while piston moves from BDC and covers a predetermined distance between BDC and TDC as per item i—b above,
    b—Compression stage, while piston moves from the predetermined distance (as described in point a above) and moves to the TDC of the corresponding cylinder, (covers the top half-part of that cylinder),
  iii—Extend the expansion stroke:
    a. Significantly Extends the expansion stroke of the Power Cycle and accordingly the expansion ratio of the combustions gases, beyond those of both the conventional 'Air Standard Otto Cycle' and 'Air Standard Diesel Cycle'.
      It actually provides the opportunity to select the expansion ratio for the intended engines in a manner to achieve the highest efficiency for that engine.
  vi—Improve Conditions of Exhaustion Stroke:
    a—Exhaust stroke is similar to the conventional operation of the involved engines and is performed while corresponding piston moves from BDC to TDC. However the main difference in the actual size of the exhausted combustion gases, which is much smaller in the modified engines and at lower pressure and temperature. Hence, requirement for power to evict the combustion gases out of the cylinders will be much less (negligible)

As could be noticed the new power cycle is substantially different from both of the conventional 'Air Standard Otto Cycle' and 'Air Standard Diesel Cycle'. It has it's own analytical characteristics and approach and of particular importance is the provision of high flexibility of the expansion ratio of the combustion gases. Controlling system and mechanism (cam shaft) could also be further tuned and controlled to have lower expansion ratios with lower RPM of the 'crank shaft' and higher expansion ratios with higher RPM, and also to control the exhaust pressure just above atmospheric pressure.

It is applied to operation of the reciprocating 'internal combustion engines', which have some or all the modifications introduced into their construction, and will provide operation conditions of higher efficiency and performance for the said engines. FIGS. 3, 4, 5 and 6, It is only fair that this new applied "Power Cycle" to be named as the: "Air Standard Atalla Modified Cycle".

Engines operating on this 'Air Standard Atalla Modified Cycle' could be categorized and expressed in the actual practice as:
  Atalla Mod 30—The Cylinders will be filled with 70% of the full size,
  Atalla Mod 40—The Cylinders will be filled with 60% of the full size,
  Atalla Mod 50—The Cylinders will be filled with 50% of the full size,
  Atalla Mod 60—The Cylinders will be filled with 40% of the full size,
  And all other selected filling of the cylinders, as:
  Atalla Mod 35, Atalla Mod 38, or Atalla Mod 42, or Atalla Mod 45, etc.

Two Stroke Engines:

These are usually small type of engines and applied to motorcycles (fast moving vehicles). However, the modification could also be successfully applied to the two stroke engines and improve their efficiency, performance and the environmental issues associated with these types of engines.

The modification for 'Air Standard Otto Cycle' or the 'Air Standard Diesel Cycle', could also be applied to the two stroke engines. The modifications comprise also the mechanism on the cam shaft or any alternate devices with the function of the cam shaft, which controls the opening and closing of inlet-outlet portal, and the required reduction of size of the combustion chambers.

Figure 12:
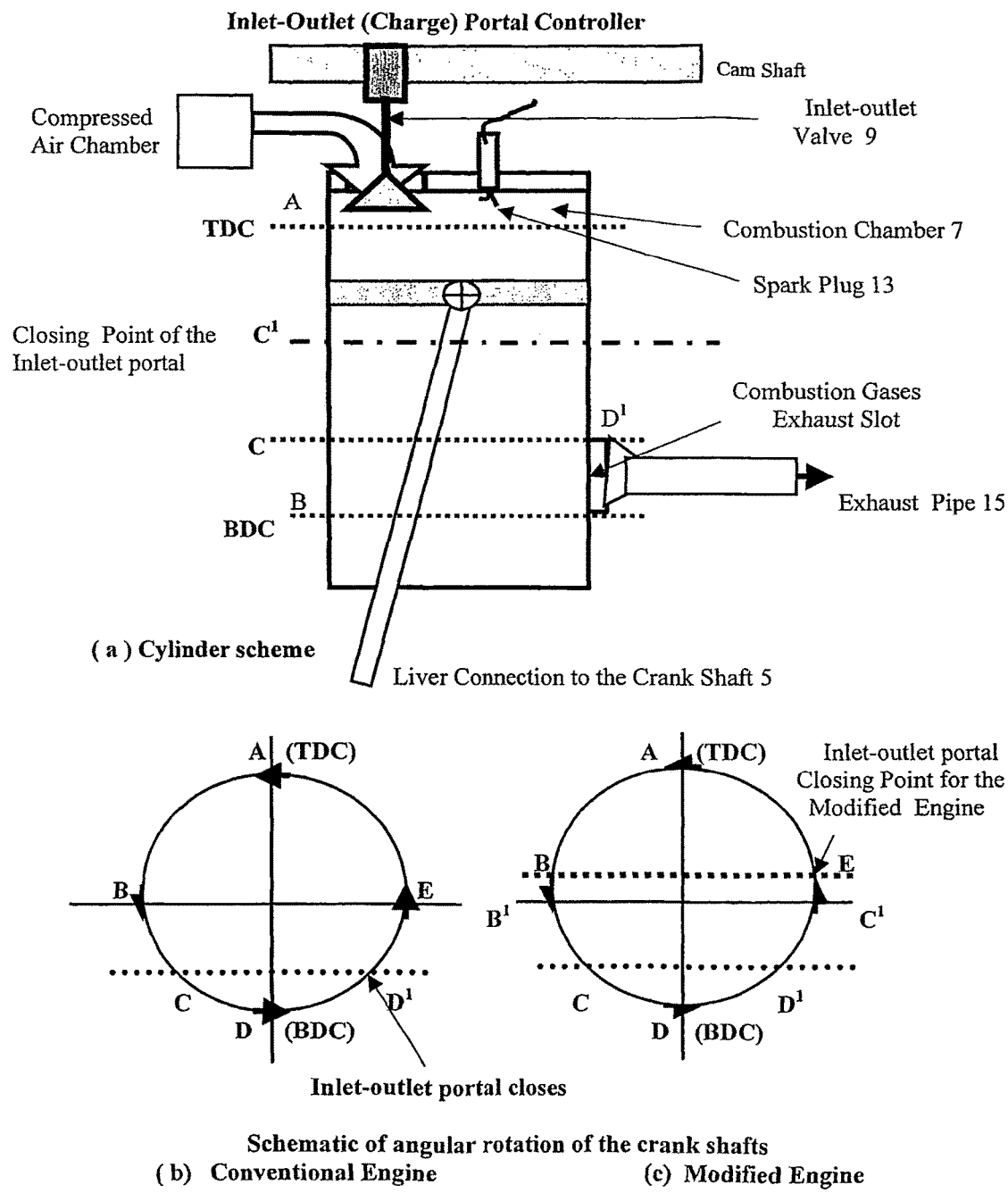
FIG. 12 shows the schematic diagram showing components of the cylinder and rotation of the crank shaft (conventional and modied) of the two stroke engines.

However, due to the different mode of operation of the two stroke engines, which could be characterized by: FIG. 12,
    a—All four operation strokes are performed during one full revolution of the crank shaft, b. There is no exhaust valve,
c. Exhaustion of combustion gases takes place through a longitudinal slot in the lower section of each cylinder,
d. Air-fuel mixture is little compressed and fed to the cylinder under positive pressure,
e. The fed air-fuel mixture into the cylinder also performs the eviction of the combustion gases (exhaust process-stroke),
f. Efficiency of these engines is usually very low, Hence, the modification will need to be applied skillfully and carefully to realize the expected improvements. Modification of the mechanism controlling opening and closing of the inlet-outlet portal should be applied (introduced) in a manner to allow the full power cycle (2 strokes—for every one full revolution of the crank shaft) to run smoothly and trouble free also, as compared with the conventional operation, and improve the efficiency of the involved engines.

The increased efficiency of the two-stroke engine could be explained from the operation strokes of the modified engine as compared with the conventional engine, as follows:

For every full revolution of the Crank Shaft (360 angular degrees), starting from point A (FIG. 12) the two strokes of the modified engine, as compared with the conventional engines, will be performed as follows:

Assume the power cycle start from Power Stroke:
Power Stroke: (Expansion Stroke)
A—Conventional Engines:
Piston will move from TDC to point C (FIG. 12 a) and from point A to point C (FIG. 12 b)
Ignition of the compressed air-fuel mixture commences and significantly raises temperature and pressure of the combustion gases, which will expand and push the piston down from TDC to point C (FIG. 12 a), or point A to point C on the angular path of the crank shaft (FIG. 12 b),
Expansion ratio: 8 to 9
B—Modified Engines:
Piston will also move from TDC to point C (FIG. 12 a) and from point A to point C (FIG. 12 c)
Ignition of the compressed air-fuel mixture commences the fuel combustion and significantly raises temperature and pressure of the combustion gases, which will expand and push the piston down from TDC to point C (FIG. 12 a), or point A to point C on the angular path of the crank shaft (FIG. 12 c),
Expansion ratio: 16 to 18
Exhaustion Stroke:
A—Conventional Engines:
Piston will move from point C to BDC and return back to point C (FIG. 12 a) and from point C to point $D^1$ (FIG. 12 b),
When piston reaches and exceeds Point C, it will also exceed the top line (edge) of the exhaust slot and the combustion gases still under high pressure and at very high temperature will start to exit (at very high speed) the respective cylinder into the exhaust pipe and then to outside atmosphere. The process will continue while the piston moves and reaches BDC (point D on FIG. 12 a) and returns to move back towards TDC and reaches point $D^1$ (FIG. 12 a) at which point the piston will pass the top edge of the exhaust slot and complete the exhaust process (stroke).
1. Modified Engines:
Piston will also move from point C to BDC and return back to point C (FIG. 12 a) and from point C to point $D^1$ (FIG. 12 c),
When piston reaches and exceeds Point C, it will also exceed the top line (edge) of the exhaust slot and combustion gases still under high pressure and at very high temperature will start to exit (at high speed) the respective cylinder into the exhaust pipe and then to outside atmosphere. However, the exit pressure and temperature of the combustion gases are significantly lower that those of the similar conventional two-stroke engine. The process will continue while the piston moves and reaches BDC (point D on FIG. 12 a) and returns to move back towards TDC and reaches point $D^1$ (FIG. 12 a) at which point the said piston will pass the top edge of the exhaust slot and complete the exhaust process (stroke).

Co-current Charge (Suction) Stroke:
A—Conventional Engines:
Piston will moves from point C to BDC and return back to point C (FIG. 12 a) and from point C to point $D^1$ (FIG. 12 b),
When piston reaches BDC, point D (FIG. 12 b), charge valve (suction) opens,
Air-Fuel mixture will be charged under positive pressure into the cylinder, and pushes the combustion gases through the exhaust slot into the exhaust pipe and outside. This process will continue until piston reaches point C (FIG. 12 a) point $D^1$ (FIG. 12 b). Although the replacement of the combustion gases will not be complete, but it is expected that most of the combustion gases will be pushed out of the cylinder.
When piston reaches point C (FIG. 12 a), Charge valve will be closed,
Cylinder will be filled to point C (FIG. 12 a) with fresh air-fuel mixture.
B—Modified Engine:
Piston will also move from point C to BDC and return back to point C (FIG. 12 a) and from point C to point $D^1$ (FIG. 12 c),
When piston reaches BDC, point D (FIGS. 12 a and 12 c), charge valve (suction) opens, Air-Fuel mixture will be charged under positive pressure into the cylinder, and pushes the combustion gases through the exhaust slot into the exhaust pipe and outside. This process will continue also until piston reaches point C (FIG. 12 a) point $D^1$ (FIG. 12 c). Although the replacement of the combustion gases will not be complete, but it is expected that most of the combustion gases will be pushed out.
When piston reaches point C (FIG. 12 a), Charge valve (inlet-outlet valve) will continue to be open and will be closed when piston reaches point E (FIG. 12 c),
This will allow the said piston to evict some air-fuel mixture from the involved cylinder, from point C to point $C^1$ (FIG. 12 a), (from point $D^1$ to point E, FIG. 12 c),
Cylinder will be filled from TDC to point $C^1$ (FIG. 12 a) with fresh air-fuel mixture (40% to 60% of working size of the conventional cylinders).
Compression Stroke:
A—Conventional Engines:
Piston will moves from point C to TDP (FIG. 12 a) and from point $D^1$ to TDC point A (FIG. 12 b),
Piston will compress air-fuel mixture into the combustion chamber and achieve the required compression ratio of 8 to 10,
B—Modified Engines:
Piston will moves from point $C^1$ to TDP (FIG. 12 a) and from point $D^1$ to point A (TDC) (FIG. 12 c),
Piston will compress air-fuel mixture (about 40% to 60% of working size of the conventional cylinders) into the combustion chamber and achieve the required compression ratio of 8 to 9 (with the reduced volume of the combustion chamber), By introducing the modifications, operation of the same revolution will change slightly, but expected to significantly improve the engine's efficiency and performance. Hence, for every full revolution of the Crank Shaft (360 angular degrees), starting from point A (FIG. 12 b) the two strokes of the modified engine, as compared with two strokes of the conventional engine, as shown in table 4.

Embodiments of the invention significantly improve operation of the two stroke engines, and in a similar manner as the modified 4 stroke engines, in terms of:
- ☛ Significant reduction in the exhaust gases temperature (probably by more than 400 K, from—say 1400 K to below 1000 K)
- ☛ less heat loss to the cooling air due to the overall significantly reduced operation temperature, while maintaining and improving the main operation parameters as compared with the conventional engine,
- ☛ less mechanical losses by restricting the very high pressure and temperature to the top quarter portion of the stroke (softer operation conditions),
- ☛ Less severe conditions in the exhaust pipe, due to the reduced amount of combustion gases (probably by more than 40%) and lower temperature as mentioned in item No 1 above, for the same gross horse power, Environment:
- ☛ Very significant reduction in the emission of $CO_2$ to atmosphere by the increased efficiencies of the Internal Combustion Engines, which should require much less fuel for the same net break horse power,
- ☛ Emission of significantly less harmful and incompletely combusted mater (quantity and quality) to atmosphere by allowing much more time for completing the combustion of fuels in the cylinder itself and under conditions of higher temperature,
- ☛ Significant reduction of the engine noise, as a result of the much reduced exhaust pressure, Ironically, efficiency of the 2 stroke engines may be improved even by a higher margin than the 4 stroke engines and also significantly improve the environmental aspects of operation of the 2 stroke engines, in terms of much reduced noise and emission of $CO_2$ and noxious gases.

➔ Example

Compare performance of a conventional engine operating on 'Air Standard Otto Cycle' and the same engine modified and being operated on the 'Air Standard Atalla Modified Cycle' as per the following:

Assume a 4 stroke gasoline engine of 2000 cc size,
Assume the engine is running at 2400 RPM
Compression ratio 9.5
Fuel supply 2720 Joule (650 cal) per liter,
A—For Conventional Engines: 'Air Standard Otto Cycle'
Assume the engine efficiency at 25%
Main Operation Indicators:

$$\text{Released energy per second} = \frac{2400/2^*}{60 \text{ s/min}} \times 2 \text{ litres} \times 2720 = 108800 \text{ Joule/s}$$

Where 2* represents the full 2 revolutions of the crank shaft to complete a full one power cycle, $$\text{Useful energy per second} = 108800 \times \frac{25}{100} = 27200 \text{ joule/s}$$

$$\text{Develop horse power} = \frac{27200}{10} \times 1/75 \text{ (kg/s)} = 36.26 \text{ HP}$$

Where 10 is the conversion factor between the thermal and mechanical energies.
Kg.m=10 joule (2.39 cal)-

TABLE 4

Operation of conventional and modified two stroke engines according to embodiments of the invention.

| Performed Stroke | Conventional Engine (FIG. 12 b) | Modified Engine (FIG. 12c) |
|---|---|---|
| 1- Power Stroke Ignition and combustion gases expansion. Piston moves, while | | |
| a- Adiabatic expansion of combustion gases and extraction of useful energy, | a- From point A to Point C | a- From point A to Point C |
| b- Inlet-outlet portal is closed | b- Continue to be closed | b- Continue to be closed |
| 2- Exhaustion Stroke, Combustion gases will be exhausted through a side slot on the side of cylinder Piston will move, while: | | |
| a- Exhaustion of combustion gases starts and continues, | a- From point C To Point $D^1$. | a- From point C To Point $D^1$. |
| b- b- Co-current Suction (or in this case charge) valve opens: | b- From a point just pass point D, | b- From a point just pass point D |
| c- Inlet-outlet portal closure, | c- When the piston reaches point $D^1$, | c- When the piston reaches point E, |
| 4- Compression Stroke Piston will move, while: | | |
| a- Air-fuel mixture is compressed, | b- From point $D^1$ to point A | a- From point E to point A |
| b- Charge valve is closed | c- Continue to be closed | b- Continue to be closed |
| Start new cycle and repetitively repeat? | Yes | Yes |
| Operation Parameters | | |
| Compression ratio | 8 to 9 | 8 to 9 |
| Expansion Ratio | 8 to 9 | 15 to 18 |
| Efficiency % | 16 to 22 | Min. 25 to 35 |

B—Engine with modifications: 'Air Standard Atalla Modified Cycle'
Same gasoline engine (active operation work will be 1000 cc)
Compression ratio 19,
Efficiency at 40%, $$\text{Released energy per second} = \frac{2400/2}{60} \times 1 \text{ litres} \times 2720 = 54,400/s$$

$$\text{Useful energy per second} = 54,400 \times \frac{40}{100} = 21,760 \text{ Joule/s}$$

$$\text{Developed horse power} = \frac{21,760}{10} \times 1/75 = 29.00 \text{ HP}$$

This horsepower is developed with the use of only 50% fuel as compared with the 'Air Standard Otto Cycle'.

Hence, improved performance could be expressed as the achieved power in two 'Power Cycles' with the same size physical engine, for the same amount of fuel, $$\text{Improvement will be} = \frac{29.00 \times 2}{36.26} \times 100 = 160\%$$

This is a very encouraging result and is believed to be achievable in practice or could even be further improved with development and selection of the most suitable engineering designs and operation conditions.

Improvement could be shown: If a current conventional car makes—say 10 km per liter fuel, then with the modifications the same car will make about:

1.6×10=16 km per liter fuel

The same engine (car) with modification will also develop 36.26 horse power (HP), by increasing the RPM from the assumed 2400 RPM—in the example—to: (indicative only)

$$\text{RPM (Approximate)} = \frac{36.26}{29.00} \times 2400 = 3000$$

The same engine can also develop 36,26 horse power (HP), by increasing the filling the working volume of air-fuel mixture—in the example—to: (indicative only)

Air-fuel mixture working volume (W V) in the involved cylinders:

$$WV = \frac{\text{Efficiency of the conventional engine } 0.25}{\text{Efficiency of the modified engine } 0.40} \times 100 = 62.5\%$$

The invention claimed is:

1. Apparatus for controlling the volume of air or an air and non-combusted fuel mixture inside a cylinder of an internal combustion engine, comprising:
    an inlet-outlet portal having open and closed states and connected to air or an air and non-combusted fuel source;
    a piston housed within a cylinder of the engine, the piston being movable within the cylinder through a stroke volume defined between a top dead center position and a bottom dead center position;
    a combustion chamber of the cylinder having a combustion chamber volume defined by the piston when the piston is in the top dead center position;
    a cam having a rotational position fixedly offset with respect to the bottom dead center position of the piston, wherein the cam controls the closing times of the inlet-outlet portal such that the engine has a compression ratio which is less than an expansion ratio thereof and wherein the cam controls the inlet-outlet portal such that when open, the inlet-output portal permits air or an air and non-combusted fuel mixture to enter or enter and exit the cylinder and when closed, the inlet-outlet portal prevents air or an air non-combusted fuel mixture from entering or exiting the cylinder, wherein the volume of air or an air and non-combusted fuel mixture located inside the cylinder when the inlet-outlet portal closes defines a modified stroke volume that is less than the stroke volume, wherein the difference between the modified stroke volume and the stroke volume defines a stroke volume reduction; and
    an incompressible member defining an incompressible member volume and being located inside the combustion chamber and fixedly attached to an inside of the combustion chamber to reduce the volume of the combustion chamber, the incompressible member being separate and distinct from the piston,
    wherein the ratio of the incompressible member volume to the combustion chamber volume is the same as the ratio of the stroke volume reduction to the stroke volume.

2. Apparatus according to claim 1 in which the inlet-outlet portal remains open for at least a portion of a compression stroke as the piston moves from the bottom dead center position towards the top dead center position permitting air or air and fuel out of the cylinder.

3. Apparatus according to claim 1 in which the inlet-outlet portal is closed during at least a portion of the intake stroke as the piston moves from the top dead center position towards the bottom dead center position preventing further air or fuel and air from entering the cylinder.

4. Apparatus according to claim 1 in which the cam and inlet-outlet portal are arranged such that the inlet-outlet portal closes during the compression stroke of the piston when the piston head has moved to a position of between 30% to 60% of the distance from the bottom dead center position towards the top dead center position.

5. Apparatus according to claim 1 in which the cam and inlet-outlet portal are arranged such that the inlet-outlet portal closes during the intake stroke when the piston head has moved to a position of between 40% to 70% of the distance from the top dead center position towards the bottom dead center position.

6. An internal combustion engine comprising:
    at least one cylinder;
    a piston housed within each cylinder, the piston being movable within the cylinder through a stroke volume defined between a top dead center position and a bottom dead center position;
    a combustion chamber of each cylinder, each combustion chamber having a combustion chamber volume defined by the piston when the piston is in the top dead center position;
    at least one inlet-outlet portal for each combustion chamber having open and closed states and connected to air or air and non-combusted fuel sources;
    a rotatable cam having a rotational position fixedly offset with respect to the bottom dead center position of the piston to control each inlet-outlet portal by the cam controlling the closing times of the inlet-outlet portal such that the engine has a compression ratio which is less than the expansion ratio, wherein the volume of air or an air and non-combusted fuel mixture located inside the cylinder when the inlet-outlet portal closes defines a modified stroke volume that is less than the stroke volume, wherein the difference between the modified stroke volume and the stroke volume defines a stroke volume reduction; and an incompressible member defining an incompressible member volume and being located inside the combustion chamber and fixedly attached to an inside of the combustion chamber to reduce the volume of the combustion chamber, the incompressible member being separate and distinct from the piston, wherein the ratio of the incompressible member volume to the combustion chamber volume is the same as the ratio of the stroke volume reduction to the stroke volume.

7. A method for controlling volume of air or an air and non-combusted fuel mixture inside a cylinder of an internal combustion engine comprising a piston housed within the cylinder, the piston being movable within the cylinder through a stroke volume defined between a top dead center position and a bottom dead center position, a combustion chamber of the cylinder having a combustion chamber volume defined by the piston when the piston is in the top dead center position, the method comprising:

controlling an inlet-outlet portal having open and closed states and connected to air or air and a non-combusted fuel source;

placing an incompressible member that defines an incompressible member volume and is separate and distinct from the piston inside the combustion chamber to reduce the volume of the combustion chamber;

fixedly attaching the incompressible member to an inside of the combustion chamber;

wherein a cam having a rotational position fixedly offset with respect to the bottom dead center of the piston controls the closing times of the inlet-outlet portal such that the engine has a compression ratio which is less than the expansion ratio by the cam controlling the inlet-outlet portal when closed to prevent air or an air and non-combusted fuel mixture from entering or exiting the cylinder, wherein the volume of air or an air and non-combusted fuel mixture located inside the cylinder when the inlet-outlet portal closes defines a modified stroke volume that is less than the stroke volume, wherein the difference between the modified stroke volume and the stroke volume defines a stroke volume reduction, wherein the ratio of the incompressible member volume to the combustion chamber volume is the same as the ratio of the stroke volume reduction to the stroke volume.

8. A method according to claim 7 in which the inlet-outlet portal remains open for at least a portion of a compression stroke as the piston moves from the bottom dead center position towards the top dead center position permitting air or air and fuel out of the cylinder.

9. A method according to claim 7 in which the inlet-outlet portal closes during at least a portion of the intake stroke as the piston moves from the top dead center position towards the bottom dead center position preventing further air or fuel and air from entering the cylinder.

10. A method according to claim 7 in which a cam and spring are arranged to control the portal such that the portal closes during the compression stroke of the piston when the piston has moved to a position of between 30% to 60% of the distance from the bottom dead center position towards the top dead center position, or in which a cam and spring are arranged to control the portal such that the portal closes during the intake stroke when the piston has moved to a position of between 40% to 70% of the distance from the top dead center position towards the bottom dead center position.

11. Apparatus according to claim 1 in which the volume of air or air and non-combusted fuel located inside the cylinder when the inlet-outlet portal closes during one cycle of the engine is approximately the same as the volume of air or air and non-combusted fuel located inside the cylinder when the inlet-outlet portal closes during all subsequent cycles of the engine.

12. Apparatus according to claim 1 wherein the control apparatus controls the inlet-outlet portal such that the closing time of the inlet-outlet portal is approximately constant during all cycles of the engine.

13. Apparatus according to claim 1 further comprising an engine head configured to determine the volume of the combustion chamber.

14. The apparatus of claim 1 further comprising an exhaust valve wherein the exhaust valve is biased towards a closed position during the compression stroke.

15. The apparatus of claim 1 wherein the cam comprises a Cartesian oval arranged to extend or reduce the opening times of the inlet-outlet portal.

16. The apparatus of claim 1 further comprising a second cam for controlling the opening and closing time of an exhaust valve wherein the of the second cam is different from the of the first cam.

17. The apparatus of claim 1 further comprising a second cam for controlling the opening and closing time of an exhaust valve wherein the rotational position of the second cam is offset compared to the rotational position of the first cam and preferably wherein the rotational offset of the two cams is 22.5 degrees.

18. The apparatus of claim 1 further comprising a second cam for controlling the opening and closing time of an exhaust valve wherein the of the second cam has an increased or reduced circular span that controls the opening and closing of the inlet outlet portals compared to the of the first cam.

19. The apparatus of claim 1 further comprising a second cam for controlling the opening and closing time of an exhaust valve wherein the of the second cam extends opening of the inlet-outlet port for the duration of the movement of the piston.

20. The apparatus of claim 1 further comprising a second cam for controlling the opening and closing time of an exhaust valve wherein second cam has a longitudinal dimension which is greater than the corresponding longitudinal dimension of the first cam.

21. The apparatus of claim 1 further comprising a second cam for controlling the opening and closing time of an exhaust valve wherein first cam has a longitudinal dimension which is greater than the corresponding longitudinal dimension of the second cam and wherein the first cam has a transverse dimension which is greater than the corresponding transverse dimension of the second cam.

22. The apparatus of claim 1 further comprising a second cam for controlling the opening and closing time of an exhaust valve wherein first cam has a longitudinal dimension which is greater than the corresponding longitudinal dimension of the second cam and wherein the first cam has a transverse dimension which is less than the corresponding transverse dimension of the second cam.

23. The apparatus of claim 1 further comprising an exhaust valve wherein the exhaust valve is biased towards a closed position during the compression stroke.

24. The internal combustion engine of claim 6 wherein a duration of operation of the at least one inlet-outlet portal is approximately 135 angular degrees such that the inlet-outlet portal is open for about 250 to about 280 angular degrees of a full revolution of the crankshaft, wherein the cam has a cross-section that is substantially that of a Cartesian oval, wherein fuel injection to the engine is controlled in a manner to sustain a substantially constant and predetermined pressure while the at least one piston moves from about 20% to about 30% of a distance from the top dead center position of the piston towards the bottom dead center position, wherein the engine is provided as a fuel injection type diesel engine.

25. Apparatus according to claim 1 wherein the expansion ratio is less than twice the compression ratio.

26. The internal combustion engine of claim 6 wherein the expansion ratio is less than twice the compression ratio.

27. A method according to claim 7 wherein the expansion ratio is less than twice the compression ratio.

28. Apparatus for controlling the volume of air or an air and non-combusted fuel mixture inside a cylinder of an internal combustion engine, the apparatus comprising:
  a cylinder;
  a piston housed within the cylinder, the piston being movable within the cylinder through a stroke volume defined between a top dead center position and a bottom dead center position;
  a combustion chamber of the cylinder having a combustion chamber volume defined by surfaces of the cylinder and the piston when the piston is in the top dead center position;
  an additional, incompressible member defining an incompressible member volume and being fixedly attached to a surface of the cylinder that defines the combustion chamber volume to reduce the combustion chamber volume; and
  an inlet-outlet portal of the combustion chamber, the inlet-outlet portal having open and closed states and connected to air or an air and non-combusted fuel source, wherein, when open, the inlet-output portal permits air or an air and non-combusted fuel mixture to enter or enter and exit the combustion chamber and, when closed, the inlet-outlet portal prevents air or an air non-combusted fuel mixture from entering or exiting the combustion chamber, in which the volume of air or an air and non-combusted fuel mixture located inside the cylinder when the inlet-outlet portal closes defines a modified stroke volume that is less than the stroke volume, wherein the difference between the modified stroke volume and the stroke volume defines a stroke volume reduction, such that the engine has a compression ratio which is less than the expansion ratio,
  wherein the ratio of the incompressible member volume to the combustion chamber volume is the same as the ratio of the stroke volume reduction to the stroke volume.

29. The apparatus of claim 28, further comprising a cam arranged to couple the piston to a crank shaft of the internal combustion engine, the cam having a cam profile which controls the opening and closing times of the inlet-outlet portal, the cam profile having a rotational position fixedly offset with respect to the bottom dead center position of the piston.

30. The apparatus of claim 29, wherein the cam profile controls the closing times of the inlet-outlet portal such that the expansion ratio is less than twice the compression ratio.

31. A method of controlling the volume of air or an air and non-combusted fuel mixture inside a cylinder of an internal combustion engine, the combustion engine including a cylinder, a piston housed within the cylinder, the piston being movable within the cylinder through a stroke volume defined between a top dead center position and a bottom dead center position, a combustion chamber of the cylinder having a combustion chamber volume defined by surfaces of the cylinder and the piston when the piston is in the top dead center position, and an inlet-outlet portal of the combustion chamber, the inlet-outlet portal having open and closed states and connected to air or an air and non-combusted fuel source, wherein, when open, the inlet-output portal permits air or an air and non-combusted fuel mixture to enter or enter and exit the combustion chamber and, when closed, the inlet-outlet portal prevents air or an air non-combusted fuel mixture from entering or exiting the combustion chamber, the method comprising:
  fixedly attaching an incompressible member defining an incompressible member volume to a surface of the cylinder that defines the combustion chamber volume to reduce the combustion chamber volume; and
  controlling the inlet-outlet portal such that the volume of air or an air and non-combusted fuel mixture located inside the cylinder when the inlet-outlet portal closes defines a modified stroke volume that is less than the stroke volume, wherein the difference between the modified stroke volume and the stroke volume defines a stroke volume reduction, such that the engine has a compression ratio which is less than the expansion ratio,
  wherein the ratio of the incompressible member volume to the combustion chamber volume is the same as the ratio of the stroke volume reduction to the stroke volume.

32. The apparatus of claim 31, wherein the step of controlling includes controlling the timing of the inlet-outlet portal such that the expansion ratio is less than twice the compression ratio.

33. The apparatus of claim 28, wherein the surface of the cylinder at which the additional, incompressible member is fixedly attached is a side wall.

34. The apparatus of claim 28, wherein the additional, incompressible member is not located at a polar region of the combustion chamber.

35. An internal combustion engine including the apparatus of claim 28 and a spark plug in communication with the combustion chamber.

36. The internal combustion engine of claim 35, wherein the spark plug is located at a first end of the combustion chamber, wherein the surface of the piston when the piston is in the top dead center position is located at a second end of the combustion chamber opposite the first end, and wherein the additional, incompressible member is located between the first and second ends of the combustion chamber.

37. The internal combustion engine of claim 35, wherein the spark plug is located at a first end of the combustion chamber, wherein the surface of the piston when the piston is in the top dead center position is located at a second end of the combustion chamber opposite the first end, and wherein the surface of the cylinder to which the additional, incompressible member is fixedly attached extends between the first and second ends of the combustion chamber.

38. The apparatus of claim 28, further comprising a second additional, incompressible member fixedly attached to the surface of the cylinder that defines the combustion chamber volume to reduce the combustion chamber volume.

39. The apparatus of claim 1, wherein a surface of the cylinder at which the incompressible member is fixedly attached is a side wall.

40. The internal combustion engine of claim 6, wherein a surface of the cylinder at which the incompressible member is fixedly attached is a side wall.

41. The method of claim 7, wherein a surface of the cylinder at which the incompressible member is fixedly attached is a side wall.

* * * * *